(12) United States Patent
Yi et al.

(10) Patent No.: US 9,351,135 B2
(45) Date of Patent: May 24, 2016

(54) TRIGGER MESSAGE SENDING METHOD, DEVICE AND SYSTEM

(71) Applicant: HUAWEI DEVICE CO., LTD., Shenzhen (CN)

(72) Inventors: Qiang Yi, Beijing (CN); Hui Jin, Beijing (CN); Guodong Xue, Shenzhen (CN); Jun Zhang, Beijing (CN)

(73) Assignee: HUAWEI DEVICE CO., LTD., Shenzhen (CN)

( * ) Notice: Subject to any disclaimer, the term of this patent is extended or adjusted under 35 U.S.C. 154(b) by 0 days.

(21) Appl. No.: 14/584,440

(22) Filed: Dec. 29, 2014

(65) Prior Publication Data

US 2015/0119092 A1    Apr. 30, 2015

Related U.S. Application Data

(63) Continuation of application No. PCT/CN2013/086033, filed on Oct. 28, 2013.

(30) Foreign Application Priority Data

Jan. 16, 2013    (CN) .......................... 2013 1 0016410

(51) Int. Cl.
*H04W 4/14* (2009.01)
*H04W 4/00* (2009.01)
*H04L 1/12* (2006.01)
*H04W 88/16* (2009.01)

(52) U.S. Cl.
CPC . *H04W 4/14* (2013.01); *H04L 1/12* (2013.01); *H04W 4/005* (2013.01); *H04W 88/16* (2013.01)

(58) Field of Classification Search
None
See application file for complete search history.

(56) References Cited

U.S. PATENT DOCUMENTS

| 2012/0202508 A1 | 8/2012 | Toth et al. |
| 2014/0185522 A1 | 7/2014 | Xu |

(Continued)

FOREIGN PATENT DOCUMENTS

| CN | 102833705 | 12/2012 |
| EP | 2 750 422 A1 | 7/2014 |

(Continued)

OTHER PUBLICATIONS

International Search Report mailed Feb. 27, 2014 in corresponding International Application No. PCT/CN2013/086033.
PCT International Search Report dated Feb. 27, 2014 in corresponding International Patent Application No. PCT/CN2013/086033.

(Continued)

*Primary Examiner* — Diane Mizrahi
(74) *Attorney, Agent, or Firm* — Staas & Halsey LLP

(57) ABSTRACT

The present invention discloses a trigger message sending method, device and system, which relate to the field of communications technologies and can resolve a problem that a Machine Type Communications-Inter Working Function MTC-IWF device and a short message service-service center SMS-SC repeatedly send a trigger Trigger message to a user equipment UE. The method includes: receiving, by the MTC-IWF device, a delivery report sent by the SMS-SC, where the delivery report is sent to the MTC-IWF device by the SMS-SC after the SMS-SC fails to send the trigger message to the UE; and waiting, by the MTC-IWF device according to the delivery report, for the SMS-SC to resend the trigger message, or resending, by the MTC-IWF device, the trigger message according to the delivery report. The present invention is mainly used in a process of sending a trigger message.

22 Claims, 8 Drawing Sheets

(56) References Cited

U.S. PATENT DOCUMENTS

| | | | | |
|---|---|---|---|---|
| 2014/0221026 A1* | 8/2014 | Xu | ................... | H04W 4/14 455/466 |
| 2014/0269779 A1* | 9/2014 | Shan | ................... | H04W 28/24 370/509 |
| 2014/0341041 A1* | 11/2014 | Velev | ................... | H04Q 3/0045 370/236 |
| 2015/0078154 A1* | 3/2015 | Jain | ................... | H04W 28/0242 370/230 |
| 2015/0172909 A1* | 6/2015 | Chandramouli | ........ | H04W 8/10 455/433 |
| 2015/0181564 A1* | 6/2015 | Rao | ................... | H04W 76/048 370/329 |

FOREIGN PATENT DOCUMENTS

| | | |
|---|---|---|
| WO | 2012/151963 A1 | 11/2012 |
| WO | 2012/151981 A1 | 11/2012 |

OTHER PUBLICATIONS

"3$^{rd}$ Generation Partnership Project; Technical Specification Group Services and System Aspects; Architecture enhancements to facilitate communications with packet data networks and applications (Release 11)", 3GPP TS 23.682, V11.3.0, Dec. 2012, pp. 1-29.

"Solution for T5 based device triggering", Nokia Siemens Networks, Nokia, CATT, Intel, HTC, China Mobile, Panasonic, SA WG2 Meeting #92, Jul. 2012, Barcelona, Spain, pp. 1-4.

Extended European Search Report mailed Jul. 10, 2015 for corresponding European Patent Application No. 13871744.2.

3$^{rd}$ Generation Partnership Project; Technical Specification Group Services and System Aspects; System Improvements for Machine-Type Communications (MTC) (Release 11), *3GPP TS* 23.888, V11.0.0, Sep. 2012, pp. 1-165.

3$^{rd}$ Generation Partnership Project; Technical Specification Group Services and System Aspects; Machine-Type and other Mobile Data Applications Communications Enhancements (Release 12), *3GPP TS* 23.887, V0.6.0, Dec. 2012, pp. 1-95.

* cited by examiner

TRIGGER MESSAGE SENDING METHOD, DEVICE AND SYSTEM

CROSS-REFERENCE TO RELATED APPLICATIONS

This application is a continuation of International Application No. PCT/CN2013/086033, filed on Oct. 28, 2013, which claims priority to Chinese Patent Application No. 201310016410.0, filed on Jan. 16, 2013, both of which are hereby incorporated by reference in their entireties.

TECHNICAL FIELD

The present invention relates to the field of communications technologies, and in particular, to a trigger message sending method, device and system.

BACKGROUND

A machine-to-machine (Machine to Machine, M2M for short) communications technology is widely applied to various industries in the society. It combines a communications technology and a network technology and forms a network by connecting machinery equipment distributed throughout people's daily life, thereby improving an intelligent level of devices, and bringing a new round of reform to daily life, industrial production, and the like. The M2M communications technology has features such as a wide coverage area, no need of cabling, and the like. A mobile network technology is a most popular and most market-promising technology for carrying and transmitting information of the M2M communications technology. As bandwidth of a mobile communications network continuously increases and a data service capability increasingly improves, development of the M2M communications technology may further accelerate.

In a network architecture based on the M2M communications technology, a Machine Type Communications-Inter Working Function (Machine Type Communications-Inter Working Function, MTC-IWF for short) device may provide an MTC service or a value-added service of a service capability server (Services Capability Server, SCS for short) for a user equipment (User Equipment, UE for short), or the MTC-IWF device provides, by using a Short Message Service-Service Center (Short Message Service-Service Center, SMS-SC for short), the MTC service or the value-added service of the SCS to the UE in a form of a short message service message. When the SCS needs to exchange data with the UE but has not acquired an Internet Protocol (Internet Protocol, IP for short) address yet, the MTC-IWF device usually sends a trigger (Trigger) message to the UE according to an existing identifier of the UE, so that the UE can make a communication connection to the MTC-IWF device and exchange data with the MTC-IWF device.

An MTC-IWF device sends a trigger message to a UE in two manners: (1) The MTC-IWF device sends the trigger message to a core network, and the core network sends the trigger message to the UE; (2) The MTC-IWF device sends the trigger message to the SMS-SC, the SMS-SC sends the trigger message to the core network in a form of a short message service message, and the core network sends the trigger message in the form of a short messageservice message to the UE. In the foregoing two manners of sending the trigger message, when the MTC-IWF device or the SMS-SC fails to send the trigger message, the MTC-IWF device or the SMS-SC saves the trigger message that fails to be sent and subsequently resends the trigger message that fails to be sent. Generally, the MTC-IWF device may choose one of the foregoing two sending manners to send the trigger message, and when the trigger message fails to be sent, the MTC-IWF device chooses another sending manner to resend the trigger message.

In the foregoing process of sending the trigger message, if the MTC-IWF device chooses one sending manner to send the trigger message but fails, the MTC-IWF device chooses another sending manner to send the trigger message. However, meanwhile, a device that uses the first sending manner resends the trigger message after a time interval. For example, an MTC-IWF device chooses to send a trigger message to a UE first by using an SMS-SC, the SMS-SC fails to send the trigger message, and then, the MTC-IWF device chooses to send the trigger message to the UE by using a core network; however, meanwhile, after a period of time after failing to send the trigger message, the SMS-SC resends the trigger message to the UE, which causes a problem that the MTC-IWF device and the SMS-SC repeatedly send a same trigger message to the UE, thereby causing an unnecessary signaling overhead, and wasting network resources. Likewise, when the MTC-IWF device chooses to send the trigger message first by using the core network, a similar problem of repeatedly sending a same trigger message also exists.

SUMMARY

Embodiments of the present invention provide a trigger message sending method, device and system, which can resolve a problem that an MTC-IWF device and an SMS-SC repeatedly send a same trigger message.

According to a first aspect, an embodiment of the present invention provides a trigger message sending method, and the method includes:

receiving, by a Machine Type Communications-Inter Working Function MTC-IWF device, a delivery report sent by a short message service-service center SMS-SC, where the delivery report is sent to the MTC-IWF device by the SMS-SC after the SMS-SC fails to send a trigger message to a user equipment UE; and waiting, by the MTC-IWF device according to the delivery report, for the SMS-SC to resend the trigger message, or resending, by the MTC-IWF device, the trigger message according to the delivery report.

In a first possible implementation manner of the first aspect, the waiting, by the MTC-IWF device according to the delivery report, for the SMS-SC to resend the trigger message, or resending, by the MTC-IWF device, the trigger message according to the delivery report specifically includes:

when the delivery report carries a delivery failure cause, waiting, by the MTC-IWF device according to the delivery failure cause, for the SMS-SC to resend the trigger message, or resending, by the MTC-IWF device, the trigger message according to the delivery failure cause.

According to the first aspect or the first possible implementation manner of the first aspect, a second possible implementation manner of the first aspect is further provided, where in the second possible implementation manner of the first aspect, the waiting, by the MTC-IWF device according to the delivery failure cause, for the SMS-SC to resend the trigger message, or resending, by the MTC-IWF device, the trigger message according to the delivery failure cause specifically includes:

if the delivery failure cause is Absent Subscriber Absent Subscriber or MS Busy for MT SMS MS Busy for MT SMS, waiting, by the MTC-IWF device, for the SMS-SC to resend the trigger message; and if the delivery failure cause is another cause other than Absent Subscriber and MS Busy for MT SMS, resending, by the MTC-IWF device, the trigger message.

According to the first aspect, or the first possible or the second possible implementation manner of the first aspect, a third possible implementation manner of the first aspect is further provided, where in the third possible implementation manner of the first aspect, when the MTC-IWF device resends the trigger message according to the delivery report, the method further includes:

instructing, by the MTC-IWF device, the SMS-SC to delete the trigger message, so that the SMS-SC cancels resending of the trigger message to the UE.

According to the first aspect, or the first possible, the second possible, or the third possible implementation manner of the first aspect, a fourth possible implementation manner of the first aspect is further provided, where in the fourth possible implementation manner of the first aspect, the resending, by the MTC-IWF device, the trigger message according to the delivery report specifically includes:

when the delivery report includes trigger message deleting indication information, resending, by the MTC-IWF, the trigger message, where the trigger message deleting indication information is used to indicate that the SMS-SC deletes the trigger message after failing to send the trigger message.

According to the first aspect, or the first possible, the second possible, the third possible, or the fourth possible implementation manner of the first aspect, a fifth possible implementation manner of the first aspect is further provided, where in the fifth possible implementation manner of the first aspect, before the SMS-SC sends the trigger message to the UE, the method further includes:

sending, by the MTC-IWF device, a submit trigger message to the SMS-SC, so that the SMS-SC sends the trigger message to the UE, where the submit trigger message includes information indicating that when failing to send the trigger message, the SMS-SC does not need to store the trigger message, so that after failing to send the trigger message, the SMS-SC deletes the trigger message; and the waiting, by the MTC-IWF device according to the delivery report, for the SMS-SC to resend the trigger message, or resending, by the MTC-IWF device, the trigger message according to the delivery report specifically includes:

when the delivery report carries a delivery failure cause, resending, by the MTC-IWF device, the trigger message according to the delivery failure cause.

According to the first aspect, or the first possible, the second possible, the third possible, the fourth possible, or the fifth possible implementation manner of the first aspect, a sixth possible implementation manner of the first aspect is further provided, where in the sixth possible implementation manner of the first aspect, the waiting, by the MTC-IWF device according to the delivery report, for the SMS-SC to resend the trigger message specifically includes:

when the delivery report includes trigger message saving indication information, waiting, by the MTC-IWF device, for the SMS-SC to resend the trigger message, where the trigger message saving indication information is used to indicate that the SMS-SC saves the trigger message after failing to send the trigger message.

According to the first aspect, or the first possible, the second possible, the third possible, the fourth possible, the fifth possible, or the sixth possible implementation manner of the first aspect, a seventh possible implementation manner of the first aspect is further provided, where in the seventh possible implementation manner of the first aspect, before the resending, by the MTC-IWF device, the trigger message according to the delivery report, the method further includes:

subscribing, by the MTC-IWF device from a home subscriber server HSS, to a notification message indicating that the UE is reachable; and the resending, by the MTC-IWF device, the trigger message according to the delivery report specifically includes:

resending, by the MTC-IWF device, the trigger message after the notification message that is sent by the HSS and indicates that the UE is reachable is received.

According to a second aspect, an embodiment of the present invention further provides a trigger message sending method, and the method includes:

when a short message service-service center SMS-SC fails to send a trigger Trigger message to a user equipment UE, sending, by the SMS-SC, a delivery report to a Machine Type Communications-Inter Working Function MTC-IWF device, so that the MTC-IWF device waits, according to the delivery report, for the SMS-SC to resend the trigger message, or the MTC-IWF device resends the trigger message according to the delivery report.

In a first possible implementation manner of the second aspect, the SMS-SC carries a delivery failure cause in the delivery report, so that the MTC-IWF device waits, according to the delivery failure cause, for the SMS-SC to resend the trigger message, or the MTC-IWF device resends the trigger message according to the delivery failure cause.

According to the second aspect or the first possible implementation manner of the second aspect, a second possible implementation manner of the second aspect is further provided, where in the second possible implementation manner of the first aspect, after the sending, by the SMS-SC, a delivery report to a MTC-IWF device, the method further includes:

receiving, by the SMS-SC, a trigger message deleting indication sent by the MTC-IWF device, and deleting, by the SMS-SC, the trigger message according to the trigger message deleting indication, so that the SMS-SC cancels resending of the trigger message to the UE.

According to the second aspect, or the first possible or the second possible implementation manner of the second aspect, a third possible implementation manner of the second aspect is further provided, where in the third possible implementation manner of the second aspect, before the sending, by the SMS-SC, a delivery report to a MTC-IWF device, the method further includes:

deleting, by the SMS-SC, the trigger message and adding trigger message deleting indication information to the delivery report, so that the MTC-IWF device resends the trigger message according to the trigger message deleting indication information, where the trigger message deleting indication information is used to indicate that the SMS-SC has deleted the trigger message after failing to send the trigger message.

According to the second aspect, or the first possible, the second possible, or the third possible implementation manner of the second aspect, a fourth possible implementation manner of the second aspect is further provided, where in the fourth possible implementation manner of the second aspect, before the sending, by the SMS-SC, the trigger message to the UE, the method further includes:

receiving, by the SMS-SC, a submit trigger message sent by the MTC-IWF device, where the submit trigger message includes information indicating that when failing to send the trigger message, the SMS-SC does not need to store the trigger message; and deleting, by the SMS-SC, the trigger message when the SMS-SC fails to send the trigger message to the UE.

According to the second aspect, or the first possible, the second possible, the third possible, or the fourth possible implementation manner of the second aspect, a fifth possible implementation manner of the second aspect is further provided, where in the fifth possible implementation manner of the second aspect, before the sending, by the SMS-SC, a delivery report to a MTC-IWF device, the method further includes:

adding, by the SMS-SC, trigger message saving indication information to the delivery report, so that the MTC-IWF device waits, according to the trigger message saving indication information, for the SMS-SC to resend the trigger message, where the trigger message saving indication information is used to indicate that the SMS-SC has saved the trigger message after failing to send the trigger message.

According to a third aspect, an embodiment of the present invention further provides a Machine Type Communications-Inter Working Function MTC-IWF device, and the MTC-IWF device includes:

a receiving unit, configured to receive a delivery report sent by a short message service-service center SMS-SC, where the delivery report is sent to the MTC-IWF device by the SMS-SC after the SMS-SC fails to send a trigger message to a user equipment UE; and a processing unit, configured to wait, according to the delivery report received by the receiving unit, for the SMS-SC to resend the trigger message, or resend the trigger message according to the delivery report.

In a first possible implementation manner of the third aspect, the processing unit is specifically configured to:

when the delivery report received by the receiving unit carries a delivery failure cause, wait, according to the delivery failure cause, for the SMS-SC to resend the trigger message, or resend the trigger message according to the delivery failure cause.

According to the third aspect or the first possible implementation manner of the third aspect, a second possible implementation manner of the third aspect is further provided, where in the second possible implementation manner of the third aspect, the processing unit is specifically configured to:

when the delivery failure cause received by the receiving unit is Absent Subscriber Absent Subscriber or MS Busy for MT SMS MS Busy for MT SMS, wait for the SMS-SC to resend the trigger message; and when the delivery failure cause received by the receiving unit is another cause other than Absent Subscriber and MS Busy for MT SMS, resend the trigger message.

According to the third aspect, or the first possible or the second possible implementation manner of the third aspect, a third possible implementation manner of the third aspect is further provided, where in the third possible implementation manner of the third aspect, the MTC-IWF device further includes:

an indicating unit, configured to, when the processing unit resends the trigger message according to the delivery report received by the receiving unit, instruct the SMS-SC to delete the trigger message, so that the SMS-SC cancels resending of the trigger message to the UE.

According to the third aspect, or the first possible, the second possible, or the third possible implementation manner of the third aspect, a fourth possible implementation manner of the third aspect is further provided, where in the fourth possible implementation manner of the third aspect, the processing unit is specifically configured to:

when the delivery report received by the receiving unit includes trigger message deleting indication information, resend the trigger message, where the trigger message deleting indication information is used to indicate that the SMS-SC deletes the trigger message after failing to send the trigger message.

According to the third aspect, or the first possible, the second possible, the third possible, or the fourth possible implementation manner of the third aspect, a fifth possible implementation manner of the third aspect is further provided, where in the fifth possible implementation manner of the third aspect, the MTC-IWF device further includes:

a sending unit, configured to send a submit trigger message to the SMS-SC before the SMS-SC sends the trigger message to the UE, so that the SMS-SC sends the trigger message to the UE, where the submit trigger message includes information indicating that when failing to send the trigger message, the SMS-SC does not need to store the trigger message, so that after failing to send the trigger message, the SMS-SC deletes the trigger message; where the processing unit is further configured to, when the delivery report carries a delivery failure cause, resend the trigger message according to the delivery failure cause.

According to the third aspect, or the first possible, the second possible, the third possible, the fourth possible, or the fifth possible implementation manner of the third aspect, a sixth possible implementation manner of the third aspect is further provided, where in the sixth possible implementation manner of the third aspect, the processing unit is specifically configured to:

when the delivery report received by the receiving unit includes trigger message saving indication information, wait for the SMS-SC to resend the trigger message, where the trigger message saving indication information is used to indicate that the SMS-SC saves the trigger message after failing to send the trigger message.

According to the third aspect, or the first possible, the second possible, the third possible, the fourth possible, the fifth possible, or the sixth possible implementation manner of the third aspect, a seventh possible implementation manner of the third aspect is further provided, where in the seventh possible implementation manner of the third aspect, the sending unit is further configured to, before the processing unit resends the trigger message according to the delivery report received by the receiving unit, subscribe, from a home subscriber server HSS, to a notification message indicating that the UE is reachable;

the receiving unit is further configured to receive the notification message that is sent by the HSS and indicates that the UE is reachable; and the processing unit is further configured to resend the trigger message after the receiving unit receives the notification message that is sent by the HSS and indicates that the UE is reachable.

According to a fourth aspect, an embodiment of the present invention further provides a short message service-service center SMS-SC, and the SMS-SC includes:

a trigger message sending unit, configured to send a trigger Trigger message to a user equipment UE; and a delivery report sending unit, configured to send a delivery report to a Machine Type Communications-Inter Working Function MTC-IWF device when the trigger message sending unit fails to send the trigger Trigger message to the UE, so that the MTC-IWF device waits, according to the delivery report, for the SMS-SC to resend the trigger message, or the MTC-IWF device resends the trigger message according to the delivery report.

In a first possible implementation manner of the fourth aspect, the delivery report sending unit is specifically configured to:

carry a delivery failure cause in the delivery report, so that the MTC-IWF device waits, according to the delivery failure cause, for the SMS-SC to resend the trigger message, or the MTC-IWF device resends the trigger message according to the delivery failure cause.

According to the fourth aspect or the first possible implementation manner of the fourth aspect, a second possible implementation manner of the fourth aspect is further provided, where in the second possible implementation manner of the fourth aspect, the SMS-SC further includes:

a receiving unit, configured to, after the delivery report sending unit sends the delivery report to the MTC-IWF device, receive a trigger message deleting indication sent by the MTC-IWF device; and a first processing unit, configured to delete the trigger message according to the trigger message deleting indication received by the receiving unit, so that the trigger message sending unit cancels resending of the trigger message to the UE.

According to the fourth aspect, or the first possible or the second possible implementation manner of the fourth aspect, a third possible implementation manner of the fourth aspect is further provided, where in the third possible implementation manner of the fourth aspect, the SMS-SC further includes:

a second processing unit, configured to delete the trigger message before the delivery report sending unit sends the delivery report to the MTC-IWF device; where the delivery report sending unit is further configured to add trigger message deleting indication information to the delivery report, so that the MTC-IWF device resends the trigger message according to the trigger message deleting indication information, where the trigger message deleting indication information is used to indicate that the SMS-SC has deleted the trigger message after failing to send the trigger message.

According to the fourth aspect, or the first possible, the second possible, or the third possible implementation manner of the fourth aspect, a fourth possible implementation manner of the fourth aspect is further provided, where in the fourth possible implementation manner of the fourth aspect, the receiving unit is further configured to, before the trigger message sending unit sends the trigger message to the UE, receive a submit trigger message sent by the MTC-IWF device, where the submit trigger message includes information indicating that when failing to send the trigger message, the SMS-SC does not need to store the trigger message; and the SMS-SC further includes:

a third processing unit, configured to delete the trigger message when the trigger message sending unit fails to send the trigger message to the UE.

According to the fourth aspect, or the first possible, the second possible, the third possible, or the fourth possible implementation manner of the fourth aspect, a fifth possible implementation manner of the fourth aspect is further provided, where in the fifth possible implementation manner of the fourth aspect, the SMS-SC further includes:

a fourth processing unit, configured to add trigger message saving indication information to the delivery report before the delivery report sending unit sends the delivery report to the MTC-IWF device, so that the MTC-IWF device waits, according to the trigger message saving indication information, for the SMS-SC to resend the trigger message, where the trigger message saving indication information is used to indicate that the SMS-SC has saved the trigger message after failing to send the trigger message.

According to a fifth aspect, an embodiment of the present invention further provides a trigger message sending system, and the system includes a Machine Type Communications-Inter Working Function MTC-IWF device and a short message service-service center SMS-SC, where the SMS-SC is configured to send a delivery report to the MTC-IWF when the SMS-SC fails to send a trigger Trigger message to a user equipment UE; and the MTC-IWF device is configured to receive the delivery report sent by the SMS-SC, and wait, according to the delivery report, for the SMS-SC to resend the trigger message, or resend the trigger message according to the delivery report.

According to the trigger message sending method and system, and the device that are provided in the embodiments of the present invention, when an SMS-SC fails to send a trigger message, an MTC-IWF device can receive a delivery report sent by the SMS-SC, and then the MTC-IWF device waits, according to the delivery report, for the SMS-SC to resend the trigger message, or the MTC-IWF device resends the trigger message according to the delivery report. Compared with the prior art where after the MTC-IWF device resends the trigger message to a UE, the SMS-SC still resends the trigger message to the UE, that the UE repeatedly receives the trigger message can be avoided, thereby reducing a signaling overhead generated by sending the trigger message, and saving network resources.

BRIEF DESCRIPTION OF DRAWINGS

To describe the technical solutions in the embodiments of the present invention or in the prior art more clearly, the following briefly introduces the accompanying drawings required for describing the embodiments or the prior art. Apparently, the accompanying drawings in the following description show merely some embodiments of the present invention, and a person of ordinary skill in the art may still derive other drawings from these accompanying drawings without creative efforts.

DESCRIPTION OF EMBODIMENTS

The following clearly describes the technical solutions in the embodiments of the present invention with reference to the accompanying drawings in the embodiments of the present invention. Apparently, the described embodiments are merely a part rather than all of the embodiments of the present invention. All other embodiments obtained by a person of ordinary skill in the art based on the embodiments of the present invention without creative efforts shall fall within the protection scope of the present invention.

For ease of describing embodiments of the present invention, the following first briefly introduces an M2M communications network architecture on which the embodiments of the present invention are based.

Figure 1:
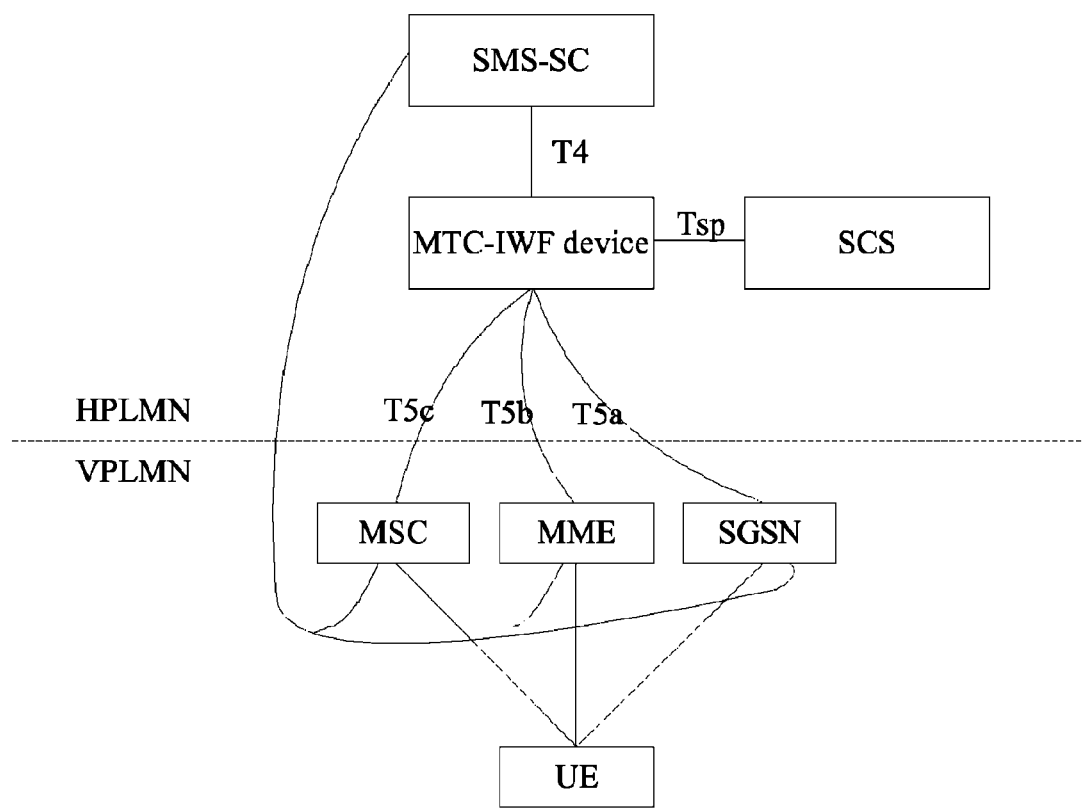
FIG. 1 is a schematic diagram of an M2M communications network architecture on which an embodiment of the present invention is based.

As shown in FIG. 1, the M2M communications network architecture consists of a home public land mobile network (Home Public Land Mobile Network, HPLMN for short) and a virtual public land mobile network (Virtual Public Land Mobile Network, VPLMN for short). On an HPLMN network side, an MTC-IWF device communicates with an SCS by using a Tsp interface, where the SCS, as an application server, is configured to provide an MTC service or a value-added service for a UE by using the MTC-IWF device, the SCS may be controlled by a home network operator or an MTC service supplier, and the MTC-IWF device receives, by using the Tsp interface, MTC service data or value-added service data provided by the SCS.

The MTC-IWF device communicates with an SMS-SC by using a T4 interface. The SMS-SC is configured to send, in a form of a short message service message, data from the MTC-IWF device to a core network device that includes a mobile switching center (Mobile Switching Center, MSC for short), a mobility management entity (Mobility Management Entity, MME for short), or a serving GPRS support node (Serving GPRS Support Node, SGSN for short), and then, the core network device sends the data to the UE; or the SMS-SC is configured to send data that is in a form of a short message service message and is from the core network device to the MTC-IWF device.

The MTC-IWF device sequentially communicates with a core network device on a VPLMN network side, such as an MSC, an MME, and an SGSN, respectively by using a T5c interface, a T5b interface, and a T5a interface; the MTC-IWF device sends data of the SCS to the core network device, and then, the core network device sends the data to the UE; or the MTC-IWF device sends data from the core network device to the SCS; where the T5c interface, the T5b interface, and the T5a interface are collectively referred to as a T5 interface.

On an M2M communications network, when the MTC-IWF device or the SCS does not acquire an IP address of a UE but needs to send data to the UE, the MTC-IWF device or the SCS may send a trigger message to the UE according to an identifier of the UE, so as to address and activate an MTC device. After receiving the trigger message sent by the MTC-IWF device or the SCS, the UE contacts the MTC-IWF device or the SCS according to content of the trigger message, so as to implement communication between the UE and the MTC-IWF device or the SCS.

Figure 2:
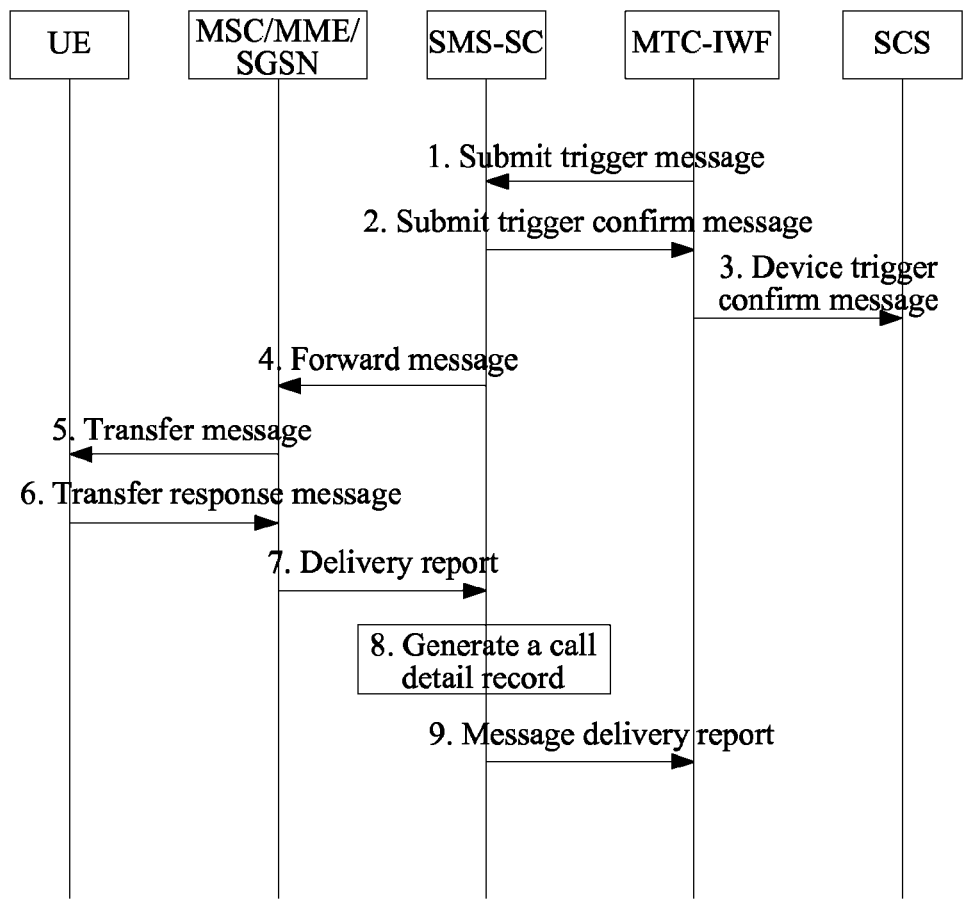
FIG. 2 is a data interaction diagram of instructing, by an MTC-IWF device, an SMS-SC to send a trigger message to a UE in the prior art.

FIG. 2 presents a data interaction process of sending, by the MTC-IWF device, a trigger message to a UE by using the SMS-SC. Specifically, as shown in FIG. 2, the process of sending, by the MTC-IWF device, a trigger message to a UE by using the SMS-SC includes the following steps:

1. The MTC-IWF device sends a submit trigger (Submit Trigger) message to the SMS-SC by using a T4 interface, where the submit trigger message is used to send a trigger message acquired by the MTC-IWF from an SCS;

2. The SMS-SC sends a submit trigger confirm (Submit Trigger Confirm) message to the MTC-IWF device by using the T4 interface, so as to send the trigger message;

3. The MTC-IWF device sends a device trigger confirm (Device Trigger Confirm) message to the SCS by using a Tsp interface;

4. The SMS-SC sends a forward message (Forward Message) to an MSC/MME/SGSN, where the forward message is used to send the trigger message acquired by the MTC-IWF device from the SCS;

5. The MSC/MME/SGSN sends a transfer message (Transfer Message) to the UE to send the trigger message;

6. The MSC/MME/SGSN receives a transfer response message sent by the UE;

7. The MSC/MME/SGSN sends a delivery report (Delivery Report) to the SMS-SC, where the delivery report carries information about whether the trigger message is successfully sent;

8. The SMS-SC generates a call detail record (calling detail records, CRD for short) according to the delivery report sent by the MSC/MME/SGSN; and 9. The SMS-SC sends a message delivery report (Message Delivery Report) to the MTC-IWF device by using the T4 interface, where the message delivery report includes the call detail record generated by the SMS-SC.

Figure 3:
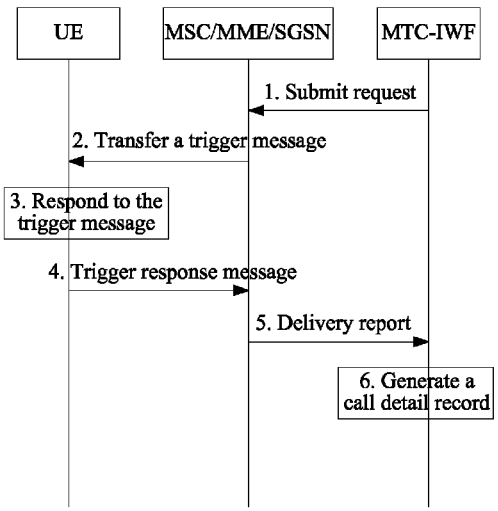
FIG. 3 is a data interaction diagram of sending, by an MTC-IWF device, a trigger message to a UE by using a second interface in the prior art.

FIG. 3 presents a data interaction process of sending, by the MTC-IWF device, a trigger message to a UE by using a T5 interface. Specifically, as shown in FIG. 3, the process of sending, by the MTC-IWF device, a trigger message to a UE by using a T5 interface includes the following steps:

1. The MTC-IWF device sends a submit request (Submit Request) to an MSC/MME/SGSN, where the submit request is used to send a trigger message acquired by the MTC-IWF from an SCS;

2. The MSC/MME/SGSN sends a transfer trigger (Transfer Trigger) message to the UE to send the trigger message;

3. The UE responds to the trigger message (Action in response to);

4. The UE returns a trigger response (Trigger Response) message to the MSC/MME/SGSN;

5. The MSC/MME/SGSN sends a delivery report (Delivery Report) to the MTC-IWF device, where the delivery report carries information about whether the trigger message is successfully sent; and 6. The MTC-IWF device generates a CDR according to the delivery report sent by the MSC/MME/SGSN.

Generally, the MTC-IWF device may instruct, by using a T4 interface, the SMS-SC to send a trigger message to a UE in a form of a short messageservice message, and may also directly send a trigger message to a UE by using a T5 interface.

Figure 4:
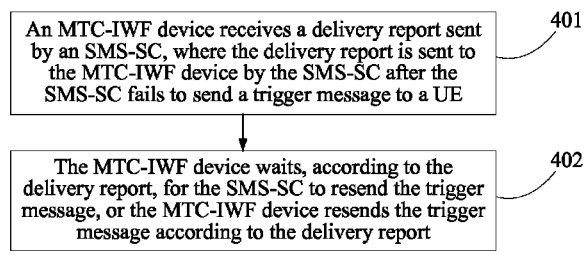
FIG. 4 is a flowchart of a first trigger message sending method according to an embodiment of the present invention.

Based on the M2M communications network architecture shown in the foregoing FIG. 1 and the manner of sending a trigger message shown in FIG. 2 and FIG. 3, an embodiment of the present invention provides a trigger message sending method. As shown in FIG. 4, the method includes the following steps:

401. An MTC-IWF device receives a delivery report sent by an SMS-SC, where the delivery report is sent to the MTC-IWF device by the SMS-SC after the SMS-SC fails to send a trigger message to a UE.

In this embodiment of the present invention, the MTC-IWF device instruct, by using a first interface, the SMS-SC to send the trigger message to the UE in a form of a short message service message, where the first interface is the T4 interface shown in FIG. 2.

In a practical data interaction process, the SMS-SC sends a trigger message to a core network device on a VPLMN network side, and then, the core network device sends the trigger message to a UE. A description that the SMS-SC sends the trigger message to the UE is only a simplified description. In a subsequent description, the latter simplified description manner is continuously used, and there should not be any difference in understanding the two description manners.

The SMS-SC sends the trigger message to the UE in the form of a short message service message. If the trigger message fails to be sent, the MTC-IEF device receives the delivery report sent by the SMS-SC, where the delivery report includes an indication that the trigger message fails to be sent.

Optionally, the delivery report may carry a delivery failure cause of a failure of the SMS-SC to send the trigger message. Causes of a failure of the SMS-SC to send the trigger message include a permanent delivery failure cause and a temporary delivery failure cause, where the temporary delivery failure cause may specifically be Absent Subscriber (Absent Subscriber), MS Busy for MT SMS (MS Busy for MT SMS), Error in MS (Error in MS), Memory Capacity Exceeded (Memory Capacity Exceeded), and the like. The SMS-SC carries the foregoing delivery failure cause in the delivery report and sends the delivery report to the MTC-IWF device. In addition, the delivery report may further carry indication information that is used to indicate, after the SMS-SC fails to send a trigger message, a processing status of the trigger message processed by the SMS-SC, for example, trigger message deleting indication information or trigger message saving indication information. The trigger message deleting indication information is used to indicate that the SMS-SC deletes, after failing to send the trigger message, the trigger message that fails to be sent, and the trigger message saving indication information is used to indicate that the SMS-SC has saved, after failing to send the trigger message, the trigger message that fails to be sent. If the SMS-SC has saved, after failing to send a trigger message, the trigger message that fails to be sent, for a temporary delivery failure cause, the SMS-SC resends the trigger message to the UE after a time interval, or the SMS-SC resends the trigger message to the UE after the UE is reachable.

402. The MTC-IWF device waits, according to the delivery report, for the SMS-SC to resend the trigger message, or the MTC-IWF device resends the trigger message according to the delivery report.

In this embodiment of the present invention, the MTC-IWF device communicates with a device on a network side by using a second interface. In the M2M communications network architecture shown in FIG. 2, a T5a interface, a T5b interface, and a T5c interface that are used by the MTC-IWF device to respectively communicate with an MSC, an MME, and an SGSN are second interfaces. As described in the foregoing, the T5a interface, the T5b interface, and the T5c interface are collectively referred to as a T5 interface. The second interface subsequently described in this embodiment of the present invention also refers to the T5 interface.

As described in the foregoing, the delivery report carries a delivery failure cause or information that indicates a processing status of a trigger message. After receiving the delivery report sent by the SMS-SC, the MTC-IWF device determines, according to the delivery failure cause or the indication information in the delivery report, to resend the trigger message to the UE or to wait for the SMS-SC to resend the trigger message.

In this embodiment of the present invention, that after the SMS-SC fails to send the trigger message, the MTC-IWF device waits for the SMS-SC to resend the trigger message, or the MTC-IWF device resends the trigger message specifically includes the following implementation manners:

(1) When the delivery failure cause is Absent Subscriber or MS Busy for MT SMS, the MTC-IWF device waits for the SMS-SC to resend the trigger message to the UE.

(2) When the delivery failure cause is another cause other than Absent Subscriber and MS Busy for MT SMS, for example, when the delivery failure cause is Error in MS or Memory Capacity Exceeded, the MTC-IWF device resends the trigger message to the UE.

(3) When the delivery report carries the trigger message deleting indication information, it indicates that the SMS-SC does not save, after failing to send the trigger message for the first time, the trigger message that fails to be sent, and the SMS-SC does not resend the trigger message to the UE subsequently; the MTC-IWF device resends the trigger message to the UE according to the trigger message deleting indication information.

(4) When the delivery report carries the trigger message saving indication information, it indicates that the SMS-SC saves, after failing to send the trigger message for the first time, the trigger message that fails to be sent, and the SMS-SC resends the trigger message to the UE subsequently; the MTC-IWF device does not send the trigger message to the UE but waits for the SMS-SC to resend the trigger message to the UE.

(5) Before the SMS-SC sends the trigger message to the UE, the MTC-IWF device sends a submit trigger message to the SMS-SC, so that the SMS-SC sends the trigger message to the UE, where the submit trigger message includes information indicating that when failing to send the trigger message, the SMS-SC does not need to store the trigger message, so that after failing to send the trigger message, the SMS-SC deletes the trigger message; after the SMS-SC fails to send the trigger message, the MTC-IWF device receives the delivery report sent by the SMS-SC; and when the delivery report carries a delivery failure cause, the MTC-IWF device resends the trigger message to the UE.

(6) After receiving the delivery report, the MTC-IWF device instructs the SMS-SC to delete the trigger message, so that the SMS-SC cancels resending of the trigger message to the UE, and the MTC-IWF device resends the trigger message to the UE, where that the MTC-IWF device instructs the SMS-SC to delete the trigger message may be performed before or after the MTC-IWF device resends the trigger message to the UE, and this embodiment of the present invention sets no limitation thereto.

In this embodiment of the present invention, that the MTC-IWF device resends the trigger message according to the delivery report includes the following: (1) The MTC-IWF device sends, according to the delivery report, the submit trigger message to the SMS-SC by using the first interface, and the SMS-SC sends the trigger message to the UE; or (2) The MTC-IWF device sends, according to the delivery report, the trigger message to the core network device by using the second interface, and the core network device sends the trigger message to the UE.

In a practical data interaction process, the MTC-IWF device sends a trigger message to a core network device on the VPLMN network side; and then, the core network device sends the trigger message to a UE. A description that the MTC-IWF device sends the trigger message to the UE is only a simplified description. In a subsequent description, the latter simplified description manner is continuously used, and there should not be any difference in understanding the two description manners.

A data interaction process of instructing, by the MTC-IWF device by using the first interface, the SMS-SC to send the trigger message to the UE is shown in FIG. 2, and a data interaction process of directly sending, by the MTC-IWF device, the trigger message to the UE by using the second interface is shown in FIG. 3. Details are not described herein again.

Before the MTC-IWF device resends the trigger message according to the delivery report, the MTC-IWF device may further subscribe, from an HSS, to a notification message indicating that the UE is reachable. After receiving the notification message that is sent by the HSS and indicates that the UE is reachable, the MTC-IWF device resends the trigger message.

In the prior art, regardless of whether an MTC-IWF device instructs an SMS-SC to send a trigger message by using a first interface or an MTC-IWF device directly sends a trigger message by using a second interface, when the trigger message fails to be sent, both the MTC-IWF device and the SMS-SC save the trigger message that fails to be sent and resend the saved trigger message to a UE when the UE is reachable. However, in the existing process of sending a trigger message, when the MTC-IWF device instructs, first by using the first interface, the SMS-SC to send the trigger message but fails, the MTC-IWF device chooses the second interface to send the trigger message to the UE, but when the UE is reachable, the SMS-SC resends the saved trigger message to the UE. As a result, the MTC-IWF device and the SMS-SC repeatedly send a same trigger message to the UE, which increases a signaling overhead. In addition, a same problem also exists when the MTC-IWF device sends the trigger message to the UE first by using the second interface but fails, that is, when the MTC-IWF device first chooses the second interface to send the trigger message to the UE but fails, the MTC-IWF device instructs, by using the first interface, the SMS-SC to send the trigger message to the UE, but when the UE is reachable, the MTC-IWF device resends the saved trigger message to the UE by using the second interface. As a result, the MTC-IWF device and the SMS-SC repeatedly send a same trigger message to the UE.

According to the trigger message sending method provided in this embodiment of the present invention, when an SMS-SC fails to send a trigger message, an MTC-IWF device can receive a delivery report sent by the SMS-SC, and then the MTC-IWF device waits, according to the delivery report, for the SMS-SC to resend the trigger message, or the MTC-IWF device resends the trigger message according to the delivery report. Compared with the prior art where after the MTC-IWF device resends the trigger message to a UE, the SMS-SC still resends the trigger message to the UE, that the UE repeatedly receives the trigger message can be avoided, thereby reducing a signaling overhead generated by sending the trigger message, and saving network resources.

Figure 5:
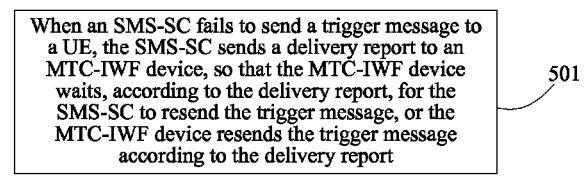
FIG. 5 is a flowchart of a second trigger message sending method according to an embodiment of the present invention.

Further, based on the M2M communications network architecture shown in the foregoing FIG. 1 and the manner of sending a trigger message shown in FIG. 2 and FIG. 3, an embodiment of the present invention further provides a trigger message sending method. As shown in FIG. 5, the method includes the following steps:

501. When an SMS-SC fails to send a trigger message to a UE, the SMS-SC sends a delivery report to an MTC-IWF device, so that the MTC-IWF device waits, according to the delivery report, for the SMS-SC to resend the trigger message, or the MTC-IWF device resends the trigger message according to the delivery report.

The SMS-SC sends the trigger message to the UE in a form of a short message service message. If the trigger message fails to be sent, the SMS-SC sends the delivery report to the MTC-IEF device, where the delivery report includes an indication that the trigger message fails to be sent.

In a practical data interaction process, the SMS-SC sends a trigger message to a core network device on a VPLMN network side, and then, the core network device sends the trigger message to a UE. A description that the SMS-SC sends the trigger message to the UE is only a simplified description. In a subsequent description, the latter simplified description manner is continuously used, and there should not be any difference in understanding the two description manners.

A first interface is used by the MTC-IWF device to communicate with the SMS-SC. In this embodiment of the present invention, the first interface is the T4 interface shown in FIG. 2, and the SMS-SC sends the delivery report to the MTC-IWF device by using the first interface. The SMS-SC carries, in the delivery report, a delivery failure cause or indication information that is used to indicate, after the SMS-SC fails to send a trigger message, a processing status of the trigger message processed by the SMS-SC, so that the MTC-IWF device chooses, according to the delivery report, a second interface to send the trigger message to the UE or waits for the SMS-SC to resend the trigger message. Specifically, causes of a failure of the SMS-SC to send the trigger message include a permanent delivery failure cause and a temporary delivery failure cause, where the temporary delivery failure causes may be specifically Absent Subscriber (Absent Subscriber), MS Busy for MT SMS (MS Busy for MT SMS), Error in MS (Error in MS), and Memory Capacity Exceeded (Memory Capacity Exceeded). The SMS-SC carries the foregoing delivery failure cause in the delivery report and sends the delivery report to the MTC-IWF device. In addition, the delivery report carries indication information that is used to indicate, after the SMS-SC fails to send a trigger message, a status of a trigger message processed by the SMS-SC, for example, trigger message deleting indication information or trigger message saving indication information. The trigger message deleting indication information is used to indicate that the SMS-SC deletes, after failing to send the trigger message, the trigger message that fails to be sent, and the trigger message saving indication information is used to indicate that the SMS-SC has saved, after failing to send the trigger message, the trigger message that fails to be sent. If the SMS-SC has saved, after failing to send a trigger message, the trigger message that fails to be sent, for a temporary delivery failure cause, the SMS-SC resends the trigger message to the UE after a time interval, or the SMS-SC resends the trigger message to the UE after the UE is reachable.

In this embodiment of the present invention, that after the SMS-SC fails to send the trigger message, the MTC-IWF device waits for the SMS-SC to resend the trigger message, or the MTC-IWF device resends the trigger message specifically includes the following implementation manners:

(1) The SMS-SC adds the delivery failure cause to the delivery report; when the delivery failure cause is Absent Subscriber or MS Busy for MT SMS, the MTC-IWF device waits for the SMS-SC to resend the trigger message to the UE; when the delivery failure cause is another cause other than Absent Subscriber and MS Busy for MT SMS, for example, when the delivery failure cause is Error in MS or Memory Capacity Exceeded, the MTC-IWF device resends the trigger message to the UE.

(2) The SMS-SC deletes the trigger message that fails to be sent and adds the trigger message deleting indication information to the delivery report, where the trigger message deleting indication information indicates that the SMS-SC does not save, after failing to send the trigger message for the first time, the trigger message that fails to be sent, and the SMS-SC does not resend the trigger message to the UE subsequently; the MTC-IWF device resends the trigger message to the UE according to the trigger message deleting indication information.

(3) The SMS-SC adds the trigger message saving indication information to the delivery report, where the trigger message saving indication information indicates that the SMS-SC saves, after failing to send the trigger message for a first time, the trigger message that fails to be sent, and resends the trigger message to the UE subsequently; the MTC-IWF device does not send the trigger message to the UE but waits for the SMS-SC to resend the trigger message to the UE.

(4) The SMS-SC receives a submit trigger message sent by the MTC-IWF device and sends the trigger message to the UE according to the submit trigger message, where the submit trigger message includes information indicating that when failing to send the trigger message, the SMS-SC does not need to store the trigger message; when failing to send the trigger message, the SMS-SC deletes the trigger message; after the SMS-SC fails to send the trigger message, the MTC-IWF device receives the delivery report sent by the SMS-SC; and when the delivery report carries a delivery failure cause, the MTC-IWF device resends the trigger message to the UE.

(5) After receiving the delivery report, the SMS-SC deletes the trigger message according to an indication of the MTC-IWF device and the SMS-SC cancels resending of the trigger message to the UE, and the MTC-IWF device resends the trigger message to the UE, where that the MTC-IWF device instructs the SMS-SC to delete the trigger message may be performed before or after the MTC-IWF device resends the trigger message to the UE, and this embodiment of the present invention sets no limitation thereto.

In this embodiment of the present invention, that the MTC-IWF device resends the trigger message according to the delivery report includes the following: (1) The MTC-IWF device sends, according to the delivery report, the submit trigger message to the SMS-SC by using the first interface, and the SMS-SC sends the trigger message to the UE; or (2) The MTC-IWF device sends, according to the delivery report, the trigger message to the core network device by using the second interface, and the core network device sends the trigger message to the UE.

In this embodiment of the present invention, the second interface is used by the MTC-IWF device to communicate with a device on a network side. In the M2M communications network architecture shown in FIG. 2, a T5a interface, a T5b interface, and a T5c interface that are used by the MTC-IWF device to respectively communicate with an MSC, an MME, and an SGSN are second interfaces. As described in the foregoing, the T5a interface, the T5b interface, and the T5c interface are collectively referred to as a T5 interface. The second interface subsequently described in this embodiment of the present invention also refers to the T5 interface.

In a practical data interaction process, the MTC-IWF device sends a trigger message to a core network device on the VPLMN network side; and then, the core network device sends the trigger message to a UE. A description that the MTC-IWF device sends the trigger message to the UE is only a simplified description. In a subsequent description, the latter simplified description manner is continuously used, and there should not be any difference in understanding the two description manners.

A data interaction process of instructing, by the MTC-IWF device by using the first interface, the SMS-SC to send the trigger message to the UE is shown in FIG. 2, and a data interaction process of directly sending, by the MTC-IWF device, the trigger message to the UE by using the second interface is shown in FIG. 3. Details are not described herein again.

In the foregoing process of sending the trigger message, the SMS-SC can send the delivery report that carries a delivery failure cause or indication information to the MTC-IWF device, so that the MTC-IWF device may resend the trigger message to the UE according to the delivery report. That is, if the SMS-SC resends the trigger message to the UE, the MTC-IWF device does not send the trigger message to the UE; if the SMS-SC does not resend the trigger message to the UE, the MTC-IWF device resends the trigger message to the UE. In this way, that both the MTC-IWF device and the SMS-SC resend the trigger message to the UE is avoided, thereby reducing repeated signaling overheads, and saving network resources.

Further, as a replacement for step 501, when the SMS-SC fails to send the trigger message to the UE, the SMS-SC may further cancel sending of a delivery report to the MTC-IWF, so that the MTC-IWF device cancels, according to not receiving a delivery report, choosing of the second interface to send the trigger message to the UE and waits for the SMS-SC to resend the trigger message to the UE.

Before the MTC-IWF device resends the trigger message according to the delivery report, the MTC-IWF device may further subscribe, from an HSS, to a notification message indicating that the UE is reachable. After receiving the notification message that is sent by the HSS and indicates that the UE is reachable, the MTC-IWF device resends the trigger message. After the UE is reachable, if the MTC-IWF device sends a submit trigger message to the SMS-SC, the SMS-SC resends the trigger message to the UE according to the submit trigger message.

Regardless of whether an MTC-IWF device instructs an SMS-SC to send a trigger message by using a first interface or an MTC-IWF device directly sends a trigger message by using a second interface, when the trigger message fails to be sent, both the MTC-IWF device and the SMS-SC save the trigger message that fails to be sent and resend the saved trigger message to a UE when the UE is reachable. However, in the existing process of sending a trigger message, when the MTC-IWF device instructs, first by using the first interface, the SMS-SC to send the trigger message but fails, the MTC-IWF device resends the trigger message to the UE, and when the UE is reachable, the SMS-SC resends the saved trigger message to the UE. As a result, the MTC-IWF device and the SMS-SC repeatedly send a same trigger message to the UE, which increases a signaling overhead. In addition, a same problem also exists when the MTC-IWF device sends the trigger message to the UE first by using the second interface but fails, that is, when the MTC-IWF device first chooses the second interface to send the trigger message to the UE but fails, the MTC-IWF device instructs, by using the first interface, the SMS-SC to send the trigger message to the UE, but when the UE is reachable, the MTC-IWF device resends the saved trigger message to the UE. As a result, the MTC-IWF device and the SMS-SC repeatedly send a same trigger message to the UE.

According to the trigger message sending method provided in this embodiment of the present invention, when an SMS-SC fails to send a trigger message, the SMS-SC can send a delivery report to an MTC-IWF device, and then the MTC-IWF device waits, according to the delivery report, for the SMS-SC to resend the trigger message, or the MTC-IWF device resends the trigger message according to the delivery report. Compared with the prior art where after the MTC-IWF device resends the trigger message to a UE, the SMS-SC still resends the trigger message to the UE, that the UE repeatedly receives the trigger message can be avoided, thereby reducing a signaling overhead generated by sending the trigger message, and saving network resources.

Further, as a detailed description and a further extension of the methods shown in FIG. 4 and FIG. 5, this embodiment of the present invention further provides a trigger message sending method, where the method is applied to the following scenarios:

In a first scenario of this embodiment of the present invention, when an MTC-IWF device chooses to send a trigger message to a UE by using an SMS-SC and the trigger message fails to be sent, the MTC-IWF device waits, according to a delivery failure cause in a delivery report sent by the SMS-SC, for the SMS-SC to attempt to resend the trigger message. A process of sending a trigger message is specifically as follows:

S1: The MTC-IWF device receives a trigger request (Trigger Request) sent by an SCS, where the trigger request carries a trigger message that the SCS wants to send to a terminal.

S2: The MTC-IWF device chooses to send, by using a T4 interface, the trigger message to the UE in a form of a short messageservice message.

S3: The MTC-IWF device sends a submit trigger (Submit Trigger) message to the SMS-SC, where the submit trigger message is used to send the trigger message acquired by the MTC-IWF from the SCS.

S4: The SMS-SC sends a forward message (Forward Message) to an MSC/MME/SGSN, where the forward message is used to send the trigger message acquired by the MTC-IWF device from the SCS, so that the MSC/MME/SGSN transfers the trigger message to the UE.

S5: The SMS-SC receives a delivery report (Delivery Report) sent by the MSC/MME/SGSN, where the delivery report includes a delivery failure cause.

S6: The SMS-SC sends the delivery report to the MTC-IWF device, where the delivery report includes a delivery failure cause.

S7: The MTC-IWF device learns that the delivery failure cause is Absent Subscriber Absent Subscriber or MS Busy for MT SMS MS Busy for MT SMS.

S8: The MTC-IWF device waits for the SMS-SC to attempt to resend the trigger message until the SMS-SC successfully sends the trigger message, and the MTC-IWF receives a delivery report including a delivery success indication; or the SMS-SC cannot successfully send the trigger message (for example, exceeds a maximum time limit for the SMS-SC to save an unsuccessfully sent short message service message), the SMS-SC returns a delivery report to the MTC-IWF, where the delivery report includes a delivery failure cause, and the MTC-IWF deletes, according to the delivery report, a trigger message saved by the SMS-SC; or when the SMS-SC still does not successfully send the trigger message after a trigger validity period expires, the MTC-IWF instructs the SMS-SC to delete the trigger message.

If the MTC-IWF first chooses a T5 interface to send the trigger message and fails to send the trigger message by using the T5 interface, the MTC-IWF device may choose the T4 interface to resend the trigger message, and a process of sending the trigger message by using the T4 interface is the same as the foregoing process.

In a second scenario of this embodiment of the present invention, when an MTC-IWF device chooses to send a trigger message to a UE by using an SMS-SC and the trigger message fails to be sent, the MTC-IWF device instructs, according to a delivery failure cause in a delivery report sent by the SMS-SC, the SMS-SC to delete a saved trigger message, meanwhile the MTC-IWF may choose a core network node to send the trigger message to the UE, or wait after an end user is reachable again to resend the trigger message. A process of sending a trigger message is specifically as follows:

S1: The MTC-IWF device receives a trigger request (Trigger Request) sent by an SCS, where the trigger request carries a trigger message that the SCS wants to send to a terminal.

S2: The MTC-IWF device chooses to send, by using a T4 interface, the trigger message to the UE in a form of a short messageservice message.

S3: The MTC-IWF device sends a submit trigger (Submit Trigger) message to the SMS-SC, where the submit trigger message is used to send the trigger message acquired by the MTC-IWF from the SCS.

S4: The SMS-SC sends a forward message (Forward Message) to an MSC/MME/SGSN, where the forward message is used to send the trigger message acquired by the MTC-IWF device from the SCS, so that the MSC/MME/SGSN transfers the trigger message to the UE;

S5: The SMS-SC receives a delivery report (Delivery Report) sent by the MSC/MME/SGSN, where the delivery report includes a delivery failure cause.

S6: The SMS-SC sends the delivery report to the MTC-IWF device, where the delivery report includes a delivery failure cause.

S7: The MTC-IWF device learns that the delivery failure cause is another cause other than Absent Subscriber Absent Subscriber or MS Busy for MT SMS MS Busy for MT SMS.

S8: The MTC-IWF device chooses a T5 interface to send a submit request (Submit Request) message to the MSC/MME/SGSN, where the submit request message is used to send the trigger message, so that the MSC/MME/SGSN transfers the trigger message to the UE; if the MTC-IWF also fails to transmit the trigger message by using the T5 interface, the MTC-IWF continues to save the trigger message, and according to a cause of a failure of the SMS-SC to send the trigger message or a cause of a failure of the MME/SGSN device to send the trigger message, the MTC-IWF device may subscribe, from an HSS, to a notification message indicating that the terminal is reachable again or subscribe, from a core network device, to a notification message indicating that the core network device is available. A cause of a failure to send the trigger message may be a cause of a failure to send a short message service message, such as the UE is unreachable, and may also be that a core network entity is busy, which causes that the trigger message cannot be sent successfully; in this case, the MTC-IWF may register with the HSS to subscribe to a notification message indicating that the UE is reachable, that is, register an MTC-IWF address in the HSS, or subscribe, from a core network entity, a notification message indicating that the core network entity is available; when the MTC-IWF device receives the notification message that is sent by the HSS and indicates that the UE is reachable or the notification message that is sent by the core network device and indicates that the core network device is available, the MTC-IWF device sends the trigger message to the UE according to implementation manners of the foregoing method and scenario.

If the MTC-IWF first chooses the T5 interface to send the trigger message, herein, the MTC-IWF no longer chooses the T5 interface to transmit the trigger message but continues to save the trigger message; likewise, according to a failure cause, the MTC-IWF may subscribe, from the HSS, to a notification message indicating that a terminal is reachable again or subscribe, from the core network entity, to the notification message indicating that the core network entity is available; when the MTC-IWF device receives the notification message that is sent by the HSS and indicates that the UE is reachable or the notification message that is sent by the core network device and indicates that the core network device is available, the MTC-IWF device sends the trigger message according to implementation manners of the foregoing method and scenario.

S9. The MTC-IWF device instructs the SMS-SC to delete the trigger saved message. If the SMS-SC subscribes a notification message indicating that the user equipment is reachable or the core network device is available, the SMS-SC sends a subscription cancellation request to a corresponding entity to which a subscription request is sent, so as to cancel a previously subscribed notification message.

An execution sequence of step S8 and step S9 may be changed, or the two steps may be concurrently performed. Scenario 2, as one of possible examples, constitutes no limitation to this embodiment of the present invention.

A difference between the foregoing scenario 1 and scenario 2 is as follows: In scenario 1, the delivery failure cause is Absent Subscriber Absent Subscriber or MS Busy for MT SMS MS Busy for MT SMS, accordingly, a processing manner of the MTC-IWF device is to wait for the SMS-SC to attempt to resend the trigger message to the UE; in scenario 2, the delivery failure cause is another cause other than Absent Subscriber Absent Subscriber or MS Busy for MT SMS MS Busy for MT SMS, for example, Error in MS (Error in MS) or Memory Capacity Exceeded (Memory Capacity Exceeded), accordingly, a processing manner of the MTC-IWF device is to instruct the SMS-SC to delete the saved trigger message and to choose another interface to send the trigger message or wait after the terminal is reachable again to send the trigger message.

In a third scenario of this embodiment of the present invention, when an MTC-IWF device chooses to send a trigger message to a UE by using an SMS-SC and the trigger message fails to be sent, the SMS-SC deletes the trigger message that fails to be sent and sends a delivery report to the MTC-IWF, where the delivery report includes information indicating that the trigger message is not saved. According to the information indicating that the trigger message is not saved, the MTC-IWF resends the trigger message or waits after the terminal is reachable again to send. A process of sending a trigger message is specifically as follows:

S1: The MTC-IWF device receives a trigger request (Trigger Request) sent by an SCS, where the trigger request carries a trigger message that the SCS wants to send to a terminal.

S2: The MTC-IWF device chooses to send, by using a T4 interface, the trigger message to the UE in a form of a short messageservice message.

S3: The MTC-IWF device sends a submit request (Submit Request) to the SMS-SC, where the submit request is used to send the trigger message acquired by the MTC-IWF from the SCS.

S4: The SMS-SC sends a forward message (Forward Message) to an MSC/MME/SGSN, where the forward message is used to send the trigger message acquired by the MTC-IWF device from the SCS, so that the MSC/MME/SGSN transfers the trigger message to the UE.

S5: The SMS-SC receives a delivery report (Delivery Report) sent by the MSC/MME/SGSN, where the delivery report includes a delivery failure cause.

S6: The SMS-SC deletes or does not save the trigger message that fails to be sent, that is, deletes a short messageservice message corresponding to the trigger message;

because the SMS-SC deletes the short message service message that fails to be sent, the SMS-SC does not execute any subscribing process concerning a terminal being reachable again or a network entity being available.

S7: The SMS-SC returns the delivery report to the MTC-IWF, where the delivery report carries information indicating that the trigger message is not saved, and the delivery report further includes a delivery failure cause.

S8: According to the received information indicating that the trigger message is not saved, the MTC-IWF device resends the trigger message or resends the trigger message when the UE is reachable.

S9: The MTC-IWF searches, in an HSS/HLR, for a core network entity to which the UE is currently attached, that is, a core network node that currently serves the UE, and chooses a proper interface to retransmit the trigger message according to information about the core network node acquired and a policy of an operator. For example, if the core network node acquired by the MTC-IWF from the HSS/HLR is an MME/SGSN, it indicates that the UE is attached in a PS domain, and when a network supports a T5 interface in transferring the trigger message, the MTC-IWF may choose the T5 interface to resend the trigger message. If the core network node acquired from the HSS/HLR is an MSC Server, it indicates that the UE is attached in a CS domain, and the MTC-IWF may choose the T4 interface to resend the trigger message.

When the UE is in an unreachable state, the MTC-IWF cannot acquire a valid core network node identifier from the HSS. In this case, the MTC-IWF may subscribe, from the HSS, to a notification message indicating that the UE is reachable, and the HSS records information, such as an identifier of the MTC-IWF, a trigger message failure cause, and an identifier of the UE, so that when the UE is reachable, the HSS notifies the MTC-IWF of the notification message indicating that the UE is reachable, and the MTC-IWF resends the trigger message. After receiving the notification message indicating that the UE is reachable, the MTC-IWF may also choose, according to information returned by the HSS, such as information about the core network entity to which the UE is currently attached and the policy of an operator, a specific manner of resending the trigger message.

In scenario 3, because the SMS-SC does not save the trigger message or deletes the saved trigger message in step S6, the MTC-IWF device may resend the trigger message or wait after the terminal is reachable again to resend the trigger message; because the SMS-SC does not save the trigger message, the SMS-SC no longer resends the trigger message to the UE subsequently.

In a fourth scenario of this embodiment of the present invention, when an MTC-IWF device chooses to send a trigger message to a UE by using an SMS-SC and the trigger message fails to be sent, the MTC-IWF device instructs the SMS-SC to delete the trigger message that fails to be sent, and the MTC-IWF may resend the trigger message or resend the trigger message when the UE is reachable. A process of sending a trigger message is specifically as follows:

S1: The MTC-IWF device receives a trigger request (Trigger Request) sent by an SCS, where the trigger request carries a trigger message that the SCS wants to send to a terminal.

S2: The MTC-IWF device chooses to send, by using a T4 interface, the trigger message to the UE in a form of a short messageservice message.

S3: The MTC-IWF device sends a submit request (Submit Request) to the SMS-SC, where the submit request is used to send the trigger message acquired by the MTC-IWF from the SCS; the message carries indication information that is used to indicate that the SMS-SC does not need to store the trigger message that fails to be sent, that is, deletes a short message service message corresponding to the trigger message that fails to be sent.

Herein, the indication information indicating that the SMS-SC does not need to store the trigger message that fails to be sent may be implemented in various manners, for example, the submit request includes information indicating that the trigger message that fails to be sent is not saved, or after the MTC-IWF chooses a T5 interface and fails in transmission, the indication information may be information indicating that the T5 interface fails in transmission. According to the foregoing indication information, the SMS-SC deletes the trigger message that fails to be sent.

S4: The SMS-SC sends a forward message (Forward Message) to an MSC/MME/SGSN, where the forward message is used to send the trigger message acquired by the MTC-IWF device from the SCS, so that the MSC/MME/SGSN transfers the trigger message to the UE.

S5: The SMS-SC receives a delivery report (Delivery Report) sent by the MSC/MME/SGSN, where the delivery report includes a delivery failure cause; because a transfer trigger message request used by the MTC-IWF to send the trigger message includes information indicating that the SMS-SC does not need to store the trigger message when the trigger message fails to be sent, the SMS-SC deletes the trigger message that fails to be sent and is saved by the SMS-SC, and the SMS-SC does not execute a process of subscribing to a notification message indicating that a terminal is reachable again or a network entity is available.

S6: The SMS-SC sends the delivery report to the MTC-IWF device, where the delivery report includes a delivery failure cause.

S7: After the MTC-IWF device receives the delivery report, because the MTC-IWF has instructed the SMS-SC to delete the trigger message that fails to be transmitted, the MTC-IWF device resends the trigger message or resends the trigger message when the UE is reachable.

S8: The MTC-IWF searches, in an HSS/HLR, for a core network entity to which the UE is currently attached, that is, a core network node that currently serves the UE, and chooses a proper interface to retransmit the trigger message according to information about the core network node acquired and a policy of an operator. For example, if the core network node acquired by the MTC-IWF from the HSS/HLR is an MME/SGSN, it indicates that the UE is attached in a PS domain, when a network supports a T5 interface in transferring the trigger message, the MTC-IWF may choose the T5 interface to resend the trigger message. If the core network node acquired from the HSS/HLR is an MSC Server, it indicates that the UE is attached in a CS domain, and the MTC-IWF may choose the T4 interface to resend the trigger message.

When the UE is in an unreachable state, the MTC-IWF cannot acquire a valid core network node identifier from the HSS. In this case, the MTC-IWF may subscribe, from the HSS, to a notification message indicating that the UE is reachable, and the HSS records information, such as an identifier of the MTC-IWF, a trigger message failure cause, and an identifier of the UE, so that when the UE is reachable, the HSS notifies the MTC-IWF of the notification message indicating that the UE is reachable, and the MTC-IWF resends the trigger message. After receiving the notification message indicating that the UE is reachable, the MTC-IWF may also choose, according to information returned by the HSS, such as information about the core network entity to which the UE is currently attached and the policy of an operator, a specific manner of resending the trigger message.

In this embodiment, that the MTC-IWF instructs the SMS-SC to delete the short message service message corresponding to the trigger message that fails to be sent may also be implemented in another manner, that is, the indication information that instructs to delete the short message service message corresponding to the trigger message that fails to be sent is not carried in step S2 but in step S7, where after the MTC-IWF receives the delivery report that includes a failure cause and is sent by the SMS-SC, the MTC-IWF instructs the SMS-SC to delete the trigger message saved by the SMS-SC, and when receiving a trigger message deleting indication from the MTC-IWF, the SMS-SC deletes the short message service message corresponding to the trigger message. After the SMS-SC deletes the short messageservice message, if due to a failure to send the short message service message, the SMS-SC has subscribed, from the HSS, to the notification message indicating that the UE is reachable or a notification message indicating that the network entity is available, the SMS-SC sends a subscription cancellation message to the HSS or sends a subscription cancellation message to a corresponding core network entity.

A common feature of the foregoing scenario 3 and scenario 4 is that in both scenario 3 and scenario 4, after the SMS-SC fails to send the trigger message, the SMS-SC no longer stores the trigger message that fails to be sent. A difference between the foregoing scenario 3 and scenario 4 is as follows: In scenario 3, the SMS-SC actively deletes or does not save the trigger message that fails to be sent and then carries information indicating that the trigger message is not saved in a delivery failure report, and because the SMS-SC does not save the trigger message that fails to be sent, the MTC-IWF device may resend the trigger message to the UE, in this way, the SMS-SC does not resend the trigger message to the UE subsequently; in scenario 4, the MTC-IWF instructs the SMS-SC to delete the saved trigger message, so that the SMS-SC does not resend the trigger message to the UE subsequently.

In a fifth scenario of this embodiment of the present invention, when an MTC-IWF device chooses to send a trigger message to a UE by using an SMS-SC and the trigger message fails to be sent, the SMS-SC saves the trigger message that fails to be sent and cancels sending of a delivery report to the MTC-IWF device, so that the MTC-IWF device no longer resends the trigger message to the UE to prevent repeated sending, and the MTC-IWF device waits for the SMS-SC to resend the saved trigger message to the UE. A process of sending a trigger message is specifically as follows:

S1: The MTC-IWF device receives a trigger request (Trigger Request) sent by an SCS, where the trigger request carries a trigger message that the SCS wants to send to a terminal.

S2: The MTC-IWF device chooses to send, by using a T4 interface, the trigger message to the UE in a form of a short message service message.

S3: The MTC-IWF device sends a submit request (Submit Request) to the SMS-SC, where the submit request is used to send the trigger message acquired by the MTC-IWF from the SCS.

S4: The SMS-SC sends a forward message (Forward Message) to an MSC/MME/SGSN, where the forward message is used to send the trigger message acquired by the MTC-IWF device from the SCS, so that the MSC/MME/SGSN transfers the trigger message to the UE.

S5: The SMS-SC receives a delivery failure report (Delivery Fail Report) and a delivery failure cause that are sent by the MSC/MME/SGSN.

S6: The SMS-SC saves the trigger message that fails to be sent and resends the saved trigger message to the UE when the UE is reachable again; when the SMS-SC successfully sends the trigger message, the SMS-SC returns a delivery report that includes a sending success indication to the MTC-IWF.

If the trigger message, in the SMS-SC, fails to be sent because a saving validity period expires, the SMS-SC returns a delivery report that includes a failure cause, and the MTC-IWF returns a failure report to the SCS; or if the trigger message still fails to be sent when a validity period of the trigger message expires, the MTC-IWF instructs the SMS-SC to delete the trigger message and the MTC-IWF returns a failure report to the SCS.

If the MTC-IWF first chooses a T5 interface to send the trigger message but fails to send the trigger message, and then chooses the T4 interface to send the trigger message, a process of sending a trigger message by using the T4 interface is the same as the foregoing steps S1 to S6.

In scenario 5, the SMS-SC does not send the delivery report to the MTC-IWF device, and the MTC-IWF waits for the SMS-SC to send the trigger message to the terminal, so as to prevent a problem of repeated sending caused because the MTC-IWF device resends the trigger message to the UE.

In a sixth scenario of this embodiment of the present invention, when an MTC-IWF device chooses an SMS-SC to send a trigger message to a UE and the trigger message fails to be sent, the SMS-SC saves the trigger message that fails to be sent and returns a delivery report to the MTC-IWF device, where the delivery report includes trigger message saving indication information. The MTC-IWF waits, according to the indication information, for the SMS-SC to resend the saved trigger message to the UE. A process of sending a trigger message is specifically as follows:

S1: The MTC-IWF device receives a trigger request (Trigger Request) sent by an SCS, where the trigger request carries a trigger message that the SCS wants to send to a terminal.

S2: The MTC-IWF device chooses to send, by using a T4 interface, the trigger message to the UE in a form of a short message service message.

S3: The MTC-IWF device sends a submit request (Submit Request) to the SMS-SC, where the submit request is used to send the trigger message acquired by the MTC-IWF from the SCS.

S4: The SMS-SC sends a forward message (Forward Message) to an MSC/MME/SGSN, where the forward message is used to send the trigger message acquired by the MTC-IWF device from the SCS, so that the MSC/MME/SGSN transfers the trigger message to the UE.

S5: The SMS-SC receives a delivery report (Delivery Report) sent by the MSC/MME/SGSN, where the delivery report includes a delivery failure cause.

S6: The SMS-SC saves the trigger message that fails to be sent.

S7: The SMS-SC sends the delivery report to the MTC-IWF device, where the delivery report carries trigger message saving indication information, and the delivery report further includes a delivery failure cause.

S8: The MTC-IWF device waits, according to the trigger message saving indication information, for the SMS-SC to resend the saved trigger message to the UE, and when the SMS-SC successfully sends the trigger message, the SMS-SC returns, to the MTC-IWF, a delivery report that indicates the trigger message is successfully sent.

If the trigger message, in the SMS-SC, fails to be sent because a saving validity period expires, the SMS-SC returns a delivery report that includes a failure cause, and the MTC-IWF returns a failure report to the SCS; or if the trigger message still fails to be sent when a validity period of the trigger message expires, the MTC-IWF instructs the SMS-SC to delete the trigger message and the MTC-IWF returns a failure report to the SCS.

This scenario is also applicable to a situation, in which the MTC-IWF first fails to send the trigger message by using a T5 interface and then sends the trigger message by using the T4 interface, where a process of sending the trigger message by using the T4 interface is the same as the foregoing steps S1 to S8.

In scenario 6, when the SMS-SC fails to send the trigger message to the UE, the SMS-SC may also send a delivery failure report to the MTC-IWF device. However, the SMS-SC needs to carry a piece of trigger message saving indication information in the delivery failure report, so that the MTC-IWF device learns from the trigger message saving indication information that the SMS-SC resends the saved trigger message to the UE when the UE is reachable again, so as to avoid a problem of repeated sending caused because the MTC-IWF device also sends the trigger message to the UE.

According to the foregoing six scenarios, it can be implemented that when a trigger message fails to be sent, that both an MTC-IWF device and an SMS-SC send the trigger message to a UE is avoided, thereby reducing a signaling overhead generated by repeatedly sending the trigger message, and saving network resources.

Figure 6:
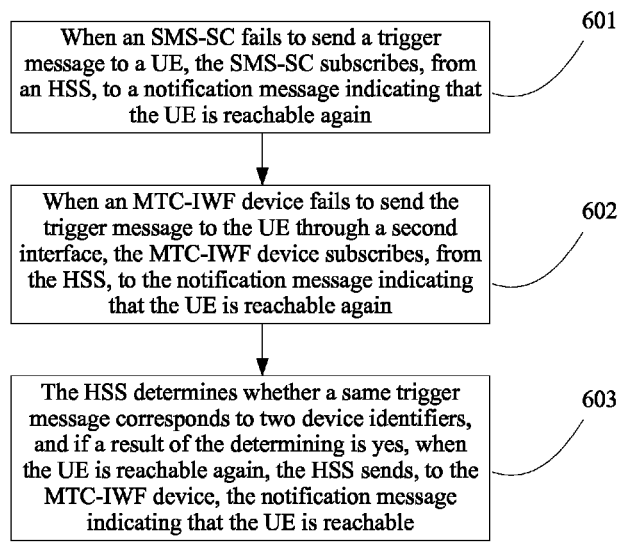
FIG. 6 is a flowchart of a third trigger message sending method according to an embodiment of the present invention.

Further, an embodiment of the present invention further provides a trigger message sending method. For a scenario in which an SMS-SC and an MTC-IWF device successively fail to send a trigger message and both save the trigger message that fails to be sent, the method provides a solution for preventing a UE from repeatedly receiving the trigger message. As shown in FIG. 6, the method includes the following steps:

601. When the SMS-SC fails to send the trigger message to the UE, the SMS-SC subscribes, from an HSS, to a notification message indicating that the UE is reachable again.

For a trigger message failure caused because the UE is unreachable, if a cause of a failure of the SMS-SC to transmit the trigger message is Absent Subscriber (Absent Subscriber) or Memory Capacity Exceeded (Memory Capacity Exceeded), the SMS-SC subscribes, from the HSS by using a core network device, to the notification message indicating that the UE is reachable again.

Specifically, when subscribing, from the HSS, to the notification message indicating that the UE is reachable again, the SMS-SC sends an SC address of the SMS-SC itself and a reference number of the trigger message to the HSS, where one reference number is used to uniquely identify one trigger message.

Further, when the SMS-SC fails to send the trigger message to the UE, the SMS-SC adds the SC address of the SMS-SC itself and the reference number of the trigger message to a delivery report and sends the delivery report to the MTC-IWF device, so that the MTC-IWF device saves the SC address and the reference number.

602. When the MTC-IWF device fails to send the trigger message to the UE by using a second interface, the MTC-IWF device subscribes, from the HSS, to the notification message indicating that the UE is reachable again.

When the SMS-SC fails to send the trigger message to the UE in step 601, the SMS-SC sends a delivery report to the MTC-IWF device, where the delivery report includes a delivery failure cause. After receiving the delivery report, the MTC-IWF device chooses the second interface to send the trigger message to the UE but the MTC-IWF fails to send the trigger message to the UE.

Specifically, when subscribing, from the HSS, the notification message indicating that the UE is reachable again, the MTC-IWF device sends a device address of the MTC-IWF device itself and the reference number of the trigger message to the HSS.

603. The HSS determines whether a same trigger message corresponds to two device identifiers, and if a result of the determining is yes, when the UE is reachable again, the HSS sends, to the MTC-IWF device, the notification message indicating that the UE is reachable.

The HSS identifies a same trigger message according to the reference number of the trigger message and determines the number of devices that subscribe, for the trigger message, to the notification message indicating that the UE is reachable again. If after failing to send the trigger message, both the SMS-SC and the MTC-IWF device subscribe, from the HSS, the notification message indicating that the UE is reachable again, when the UE is reachable again, the HSS sends, only to the MTC-IWF device, the notification message indicating that the UE is reachable, and the MTC-IWF device reselects, according to implementation manners of the foregoing embodiments or application scenarios, a policy of sending the trigger message.

Specifically, when the MTC-IWF device chooses to instruct the SMS-SC to send the trigger message to the UE, the MTC-IWF device sends, to the SMS-SC, the notification message that is sent by the HSS and indicates that the UE is reachable again, so that the SMS-SC resends, according to the notification message, the saved trigger message to the UE; when the MTC-IWF device chooses to send the trigger message to the UE by using the second interface, the MTC-IWF device resends the trigger message saved by the MTC-IWF device itself to the UE, and the MTC-IWF device instructs the SMS-SC to delete the saved trigger message, so as to prevent the SMS-SC from repeatedly sending a same trigger message to the UE.

As a detailed description of the method shown in FIG. 6, this embodiment of the present invention further provides a seventh application scenario. In the seventh scenario, a process of sending a trigger message is specifically as follows:

S1: The MTC-IWF device receives a trigger request (Trigger Request) sent by an SCS, where the trigger request carries a trigger message.

S2: The MTC-IWF device chooses to instruct, by using a T4 interface, the SMS-SC to send the trigger message to the UE in a form of a short message service message.

S3: The MTC-IWF device sends a transfer trigger message request (Transfer Trigger Request) to the SMS-SC, where the transfer trigger message request carries the trigger message.

S4: The SMS-SC sends a trigger request delivery (Trigger Request Delivery) message to an MSC/MME/SGSN, where the message carries the trigger message, so that the MSC/MME/SGSN transparently transmits the trigger message to the UE.

S5: The SMS-SC receives a delivery report (Delivery Report) sent by the MSC/MME/SGSN, where the delivery report includes a delivery failure cause.

S6: The SMS-SC saves a trigger message that fails to be sent and subscribes, by using the MSC/MME/SGSN and from an HSS, to a notification message indicating that the UE is reachable, where the subscription message carries an SC address of the SMS-SC and a reference identifier of the trigger message.

S7: The SMS-SC sends the delivery report to the MTC-IWF device, where the delivery report includes a delivery failure cause.

S8: The MTC-IWF device chooses, according to the delivery report, a T5 interface to send a trigger request delivery (Trigger Request Delivery) message to the MSC/MME/SGSN, where the message carries the trigger message, so that the MSC/MME/SGSN transparently transmits the trigger message to the UE.

S9: The trigger message fails to be transmitted by using the T5 interface, and the MTC-IWF device receives a delivery report (Delivery Report) sent by the MSC/MME/SGSN, where the delivery report includes a delivery failure cause.

S10: The MTC-IWF device saves the trigger message that fails to be sent and subscribes, by using the MSC/MME/SGSN and from the HSS, to a notification message indicating that the UE is reachable, where the subscription message carries a device address of the MTC-IWF device and the reference identifier of the trigger message.

S11: When the UE is reachable again, the HSS determines that both the SMS-SC and the MTC-IWF device subscribe, for a same trigger message and from the HSS, to a notification message indicating that the UE is reachable again.

S12: The HSS sends, to the MTC-IWF device, the notification message indicating that the UE is reachable again.

S13: The MTC-IWF device resends the trigger message according to the notification message indicating that the UE is reachable again; if the MTC-IWF chooses the T4 interface to send the trigger message to a terminal, the MTC-IWF notifies the SMS-SC of the notification message indicating that the UE is reachable; after receiving the notification message indicating that the UE is reachable, the SMS-SC sends the trigger message saved by the SMS-SC to the UE, and the MTC-IWF device deletes the trigger message saved by the MTC-IWF device itself S14: If the MTC-IWF device chooses, according to the notification message indicating that the UE is reachable again, a second interface (T5 interface) to send the trigger message saved by the MTC-IWF device itself to the UE, the MTC-IWF device instructs the SMS-SC to delete the trigger message saved by the SMS-SC.

It should be noted that an execution sequence of step S6 and step S7 may be changed, or the two steps may be concurrently performed; either step S13 or step S14 is selected as an execution step after step S12, that is, if step S13 is performed after step S12, step S14 is not performed, or if step S14 is performed after step S12, step S13 is not performed.

Optionally, as another situation of step 603, if the HSS determines that only either the SMS-SC or the MTC-IWF device subscribes, from the HSS, the notification message indicating that the UE is reachable again, when the UE is reachable again, the HSS sends, to the device that subscribes the notification message, the notification message indicating that the UE is reachable. Specifically:

(1) If the SMS-SC subscribes, from the HSS, the notification message indicating that the UE is reachable again, when the UE is reachable again, the HSS sends, only to the SMS-SC, the notification message indicating that the UE is reachable again. After receiving the notification message indicating that the UE is reachable again, the SMS-SC sends the saved trigger message to the UE, and when the trigger message is successfully sent, the SMS-SC sends a delivery success report to the MTC-IWF device; after receiving the delivery success report, the MTC-IWF device deletes the trigger message saved by the MTC-IWF device itself, so as to prevent the MTC-IWF device from repeatedly sending the same trigger message to the UE subsequently.

(2) If the MTC-IWF device subscribes, from the HSS, the notification message indicating that the UE is reachable again, when the UE is reachable again, the HSS sends, only to the MTC-IWF device, the notification message indicating that the UE is reachable again. After receiving the notification message indicating that the UE is reachable again, the MTC-IWF device sends the saved trigger message to the UE by using the second interface and instructs the SMS-SC to delete the saved trigger message, so as to prevent the SMS-SC from repeatedly sending the same trigger message to the UE subsequently.

In the prior art, when an SMS-SC and an MTC-IWF device successively fail to send a trigger message, both the SMS-SC and the MTC-IWF device save the trigger message that fails to be sent and subscribe, from an HSS, to a notification message indicating that a UE is reachable again. When the UE is reachable again, the HSS separately sends, to the SMS-SC and the MTC-IWF device, a notification message indicating that the UE is reachable. After receiving the notification message indicating that the UE is reachable, the SMS-SC resends the saved trigger message to the UE, and after receiving the notification message indicating that the UE is reachable, the MTC-IWF device instructs, by using a first interface, the SMS-SC to resend the trigger message to the UE or resends the saved trigger message to the UE by using a second interface. Therefore, in an existing process of sending a trigger message, when the UE is reachable again, the SMS-SC or the MTC-IWF device repeatedly sends the trigger message to the UE, which causes an unnecessary signaling overhead.

In the trigger message sending method provided in FIG. 6, the HSS may determine whether a subscription request for a notification message, which indicates that the UE is reachable, for a same trigger message is repeatedly received from different devices. When the UE is reachable again, the HSS sends, only to the MTC-IWF device, the notification message indicating that the UE is reachable but cancels sending, to the SMS-SC, of the notification message indicating that the UE is reachable, so as to prevent the SMS-SC from repeatedly sending the trigger message to the UE according to the notification message of the HSS when the MTC-IWF device sends the trigger message to the UE by using the first interface or the second interface, thereby reducing a signaling overhead, and saving network resources.

Figure 7:
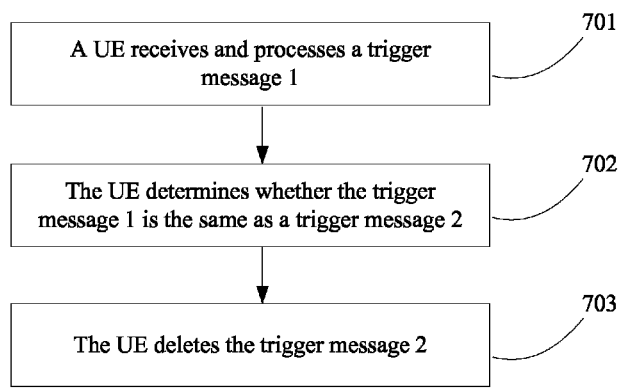
FIG. 7 is a flowchart of a trigger message sending method according to an embodiment of the present invention.

The foregoing embodiments and application scenarios focus on an improvement on an M2M communications network architecture, so as to prevent an SMS-SC and an MTC-IWF device from repeatedly sending a trigger message when the trigger message fails to be sent for a first time. In the following, an embodiment of the present invention further provides a method for receiving a trigger message, and an implementation manner that prevents a UE from repeatedly receiving a same trigger message is provided from a UE side. Specifically, as shown in FIG. 7, the method includes the following steps:

701. The UE receives and processes a trigger message 1.

After receiving the trigger message 1, the UE processes the trigger message 1 according to an existing technical process. Meanwhile, the UE acquires a trigger message reference identifier Reference Number, a validity time Validity Time, and an SCS identifier that are carried in the trigger message 1, where the validity time is a duration value. After receiving the trigger message 1, the UE starts a timer and sets duration of the timer to the duration value. During a period before time is up in the timer, the UE saves a validity time and an SCS identifier that are corresponding to the trigger message. In addition, when the trigger message 1 does not carry the validity time, the UE may also set the duration of the timer according to preset duration. When the timer expires, the reference number and related SCS identifier are deleted. If the UE receives a trigger message 2 within the duration of the timer, the UE performs step 702.

702. The UE determines whether the trigger message 1 is the same as a trigger message 2.

Specifically, the UE determines whether the reference identifier Reference Number and the SCS identifier of the trigger message 1 are the same as a reference identifier Reference Number and an SCS identifier of the trigger message 2. When the trigger message 2 is not the same as the trigger message 1, the trigger message 2 is processed according to a normal process; when the trigger message 2 is the same as the trigger message 1, the UE performs step 703.

703. The UE discards the trigger message 2.

Processing a trigger message needs to cost various resources of a UE. If the UE receives two same trigger messages that are repeatedly sent, processing the same trigger messages wastes resources of the UE. According to the method for receiving a trigger message provided in this embodiment of the present invention, a UE may determine a received trigger message. When the UE does not receive the trigger message previously, the UE processes the trigger message according to an existing process; when the UE receives the trigger message previously, the UE discards the trigger message, thereby saving an internal processing resource of the UE.

Figure 8:
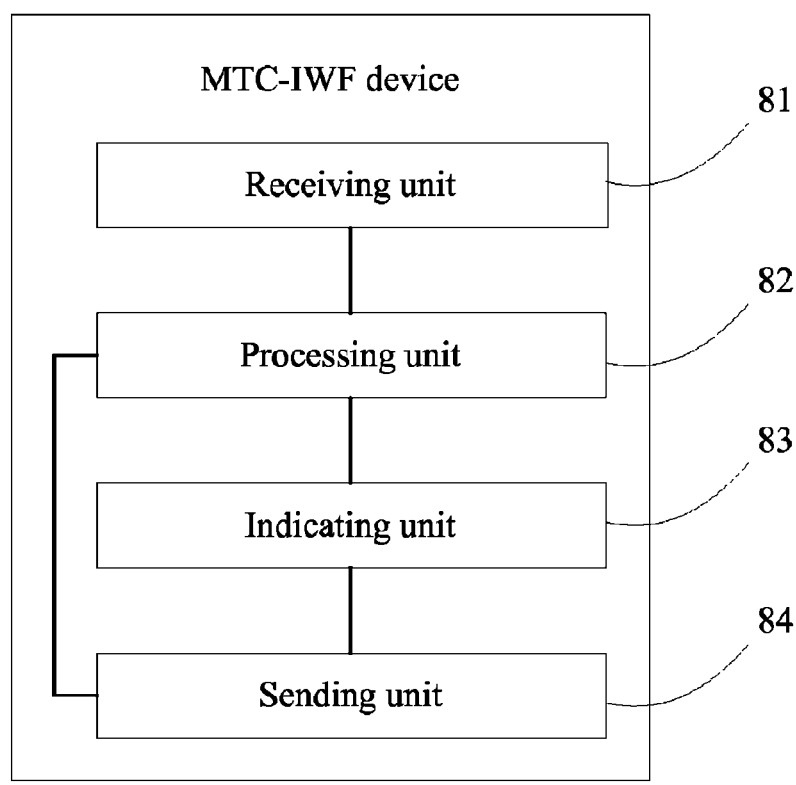
FIG. 8 is a schematic structural diagram of a first MTC-IWF device according to an embodiment of the present invention.

Referring to implementation of the foregoing method embodiments, an embodiment of the present invention provides an MTC-IWF device, where the MTC-IWF device communicates with an SMS-SC by using a first interface and communicates with a core network device by using a second interface. As shown in FIG. 8, the MTC-IWF device includes: a receiving unit 81, a processing unit 82, an indicating unit 83, and a sending unit 84, where:

the receiving unit 81 is configured to receive a delivery report sent by a short message service-service center SMS-SC, where the delivery report is sent to the MTC-IWF device by the SMS-SC after the SMS-SC fails to send a trigger message to a user equipment UE; and the processing unit 82 is configured to wait, according to the delivery report received by the receiving unit 81, for the SMS-SC to resend the trigger message, or resend the trigger message according to the delivery report.

Further, the processing unit 82 is specifically configured to:

when the delivery report received by the receiving unit 81 carries a delivery failure cause, wait, according to the delivery failure cause, for the SMS-SC to resend the trigger message, or resend the trigger message according to the delivery failure cause.

Further, the processing unit 82 is specifically configured to:

when the delivery failure cause received by the receiving unit 81 is Absent Subscriber Absent Subscriber or MS Busy for MT SMS MS Busy for MT SMS, wait for the SMS-SC to resend the trigger message; and when the delivery failure cause received by the receiving unit 81 is another cause other than Absent Subscriber and MS Busy for MT SMS, resend the trigger message.

Further, the indicating unit 83 is configured to, when the processing unit 82 resends the trigger message according to the delivery report received by the receiving unit 81, instruct the SMS-SC to delete the trigger message, so that the SMS-SC cancels resending of the trigger message to the UE.

Further, the processing unit 82 is specifically configured to:

when the delivery report received by the receiving unit 81 includes trigger message deleting indication information, resend the trigger message, where the trigger message deleting indication information is used to indicate that the SMS-SC deletes the trigger message after failing to send the trigger message.

Further, the sending unit 84 is configured to send a submit trigger message to the SMS-SC before the SMS-SC sends the trigger message to the UE, so that the SMS-SC sends the trigger message to the UE, where the submit trigger message includes information indicating that when failing to send the trigger message, the SMS-SC does not need to store the trigger message, so that after failing to send the trigger message, the SMS-SC deletes the trigger message.

The processing unit 82 is further configured to, when the delivery report carries a delivery failure cause, resend the trigger message according to the delivery failure cause.

Further, the processing unit 82 is specifically configured to:

when the delivery report received by the receiving unit 81 includes trigger message saving indication information, wait for the SMS-SC to resend the trigger message, where the trigger message saving indication information is used to indicate that the SMS-SC saves the trigger message after failing to send the trigger message.

Further, the sending unit 84 is further configured to, before the processing unit 82 resends the trigger message according to the delivery report received by the receiving unit 81, subscribe, from a home subscriber server HSS, to a notification message indicating that the UE is reachable.

The receiving unit 81 is further configured to receive the notification message that is sent by the HSS and indicates that the UE is reachable.

The processing unit 82 is further configured to resend the trigger message after the receiving unit 81 receives the notification message that is sent by the HSS and indicates that the UE is reachable.

According to the MTC-IWF device provided in this embodiment of the present invention, when an SMS-SC fails to send a trigger message, an MTC-IWF device can receive a delivery report sent by the SMS-SC, and then the MTC-IWF device waits, according to the delivery report, for the SMS-SC to resend the trigger message, or the MTC-IWF device resends the trigger message according to the delivery report. Compared with the prior art where after the MTC-IWF device resends the trigger message to a UE, the SMS-SC still resends the trigger message to the UE, that the UE repeatedly receives the trigger message can be avoided, thereby reducing a signaling overhead generated by sending the trigger message, and saving network resources.

Figure 9:
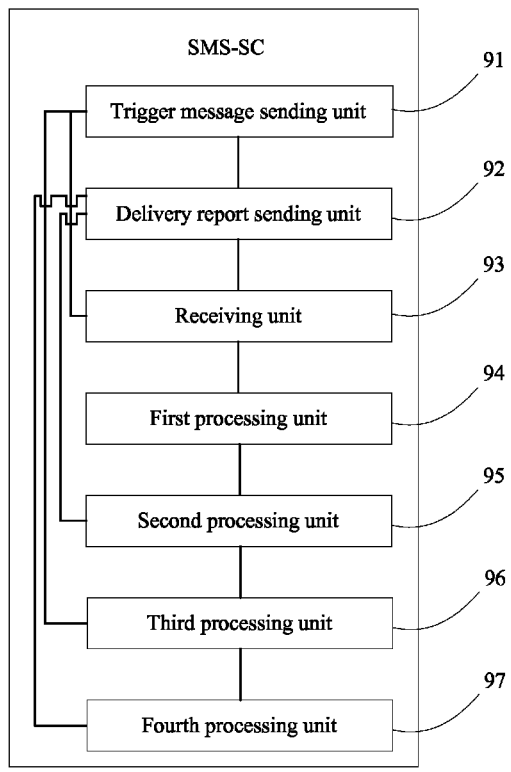
FIG. 9 is a schematic structural diagram of a first SMS-SC device according to an embodiment of the present invention.

Referring to implementation of the foregoing method embodiments, an embodiment of the present invention provides an SMS-SC, where the SMS-SC communicates with an MTC-IWF device by using a first interface. As shown in FIG. 9, the SMS-SC includes: a trigger message sending unit 91, a delivery report sending unit 92, a receiving unit 93, a first processing unit 94, a second processing unit 95, a third processing unit 96, and a fourth processing unit 97, where:

the trigger message sending unit 91 is configured to send a trigger Trigger message to a user equipment UE; and the delivery report sending unit 92 is configured to send a delivery report to the Machine Type Communications-Inter Working Function MTC-IWF device when the trigger message sending unit 91 fails to send the trigger Trigger message to the UE, so that the MTC-IWF device waits, according to the delivery report, for the SMS-SC to resend the trigger message, or the MTC-IWF device resends the trigger message according to the delivery report.

Further, the delivery report sending unit 92 is specifically configured to:

carry a delivery failure cause in the delivery report, so that the MTC-IWF device waits, according to the delivery failure cause, for the SMS-SC to resend the trigger message, or the MTC-IWF device resends the trigger message according to the delivery failure cause.

Further, the receiving unit 93 is configured to, after the delivery report sending unit 92 sends the delivery report to the MTC-IWF device, receive a trigger message deleting indication sent by the MTC-IWF device.

The first processing unit 94 is configured to delete the trigger message according to the trigger message deleting indication received by the receiving unit 93, so that the trigger message sending unit cancels resending of the trigger message to the UE.

Further, the second processing unit 95 is configured to delete the trigger message before the delivery report sending unit 92 sends the delivery report to the MTC-IWF device.

The delivery report sending unit 92 is further configured to add trigger message deleting indication information to the delivery report, so that the MTC-IWF device resends the trigger message according to the trigger message deleting indication information, where the trigger message deleting indication information is used to indicate that the SMS-SC has deleted the trigger message after failing to send the trigger message.

Further, the receiving unit 93 is further configured to, before the trigger message sending unit 91 sends the trigger message to the UE, receive a submit trigger message sent by the MTC-IWF device, where the submit trigger message includes information indicating that when failing to send the trigger message, the SMS-SC does not need to store the trigger message.

Further, the third processing unit 96 is configured to delete the trigger message when the trigger message sending unit 91 fails to send the trigger message to the UE.

Further, the fourth processing unit 97 is configured to add trigger message saving indication information to the delivery report before the delivery report sending unit 92 sends the delivery report to the MTC-IWF device, so that the MTC-IWF device waits, according to the trigger message saving indication information, for the SMS-SC to resend the trigger message, where the trigger message saving indication information is used to indicate that the SMS-SC has saved the trigger message after failing to send the trigger message.

According to the SMS-SC provided in this embodiment of the present invention, when an SMS-SC fails to send a trigger message, the SMS-SC can send a delivery report to an MTC-IWF device, and then the MTC-IWF device waits, according to the delivery report, for the SMS-SC to resend the trigger message, or the MTC-IWF device resends the trigger message according to the delivery report. Compared with the prior art where after the MTC-IWF device resends the trigger message to a UE, the SMS-SC still resends the trigger message to the UE, that the UE repeatedly receives the trigger message can be avoided, thereby reducing a signaling overhead generated by sending the trigger message, and saving network resources.

Figure 10:
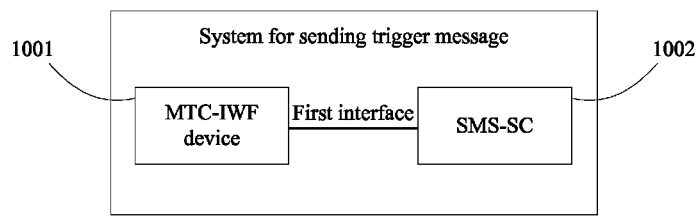
FIG. 10 is a schematic diagram of a first trigger message sending system according to an embodiment of the present invention.

Referring to the device embodiments shown in the foregoing FIG. 8 and FIG. 9, an embodiment of the present invention provides a trigger message sending system. As shown in FIG. 10, the system includes: an MTC-IWF device 1001 and an SMS-SC1002, where the MTC-IWF device 1001 is the MTC-IWF device shown in FIG. 8, and the SMS-SC1002 is the SMS-SC shown in FIG. 9. The SMS-SC 1002 communicates with the MTC-IWF device 1001 by using a first interface, where:

the SMS-SC1002 is configured to send a delivery report to the MTC-IWF1001 device when the SMS-SC1002 fails to send a trigger Trigger message to a user equipment UE; and the MTC-IWF1001 device is configured to receive the delivery report sent by the SMS-SC1002, and wait, according to the delivery report, for the SMS-SC1002 to resend the trigger message, or resend the trigger message according to the delivery report.

According to the trigger message sending system provided in this embodiment of the present invention, when an SMS-SC fails to send a trigger message, an MTC-IWF device can receive a delivery report sent by the SMS-SC, and then the MTC-IWF device waits, according to the delivery report, for the SMS-SC to resend the trigger message, or the MTC-IWF device resends the trigger message according to the delivery report. Compared with the prior art where after the MTC-IWF device resends the trigger message to a UE, the SMS-SC still resends the trigger message to the UE, that the UE repeatedly receives the trigger message can be avoided, thereby reducing a signaling overhead generated by sending the trigger message, and saving network resources.

Figure 11:
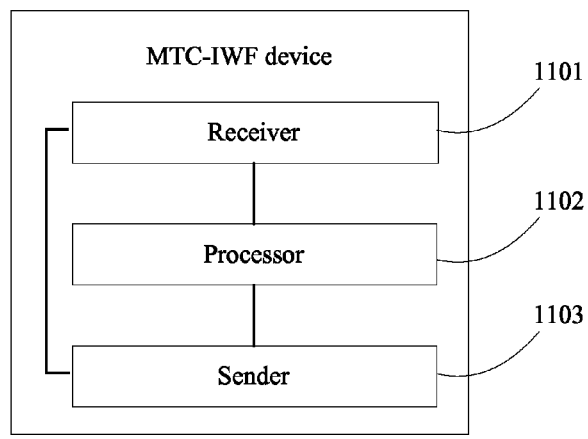
FIG. 11 is a schematic structural diagram of a second MTC-IWF device according to an embodiment of the present invention.

Referring to implementation of the foregoing method embodiments, an embodiment of the present invention further provides an MTC-IWF device, where the MTC-IWF device communicates with an SMS-SC by using a first interface and communicates with a core network device by using a second interface. As shown in FIG. 11, the MTC-IWF device includes: a receiver 1101, a processor 1102, and a sender 1103, where:

the receiver 1101 is configured to receive a delivery report sent by a short message service-service center SMS-SC, where the delivery report is sent to the MTC-IWF device by the SMS-SC after the SMS-SC fails to send a trigger message to a user equipment UE; and the processor 1102 is configured to wait, according to the delivery report received by the receiver 1101, for the SMS-SC to resend the trigger message, or resend the trigger message according to the delivery report.

Further, the processor 1102 is specifically configured to:

when the delivery report received by the receiver 1101 carries a delivery failure cause, wait, according to the delivery failure cause, for the SMS-SC to resend the trigger message, or resend the trigger message according to the delivery failure cause.

Further, the processor 1102 is specifically configured to:

when the delivery failure cause received by the receiver 1101 is Absent Subscriber Absent Subscriber or MS Busy for MT SMS MS Busy for MT SMS, wait for the SMS-SC to resend the trigger message; and when the delivery failure cause received by the receiver 1101 is another cause other than Absent Subscriber and MS Busy for MT SMS, resend the trigger message.

Further, the processor 1102 is further configured to, when resending the trigger message according to the delivery report received by the receiver 1101, instruct the SMS-SC to delete the trigger message, so that the SMS-SC cancels resending of the trigger message to the UE.

Further, the processor 1102 is specifically configured to:

when the delivery report received by the receiver 1101 includes trigger message deleting indication information, resend the trigger message, where the trigger message deleting indication information is used to indicate that the SMS-SC deletes the trigger message after failing to send the trigger message.

Further, the sender 1003 is configured to send a submit trigger message to the SMS-SC before the SMS-SC sends the trigger message to the UE, so that the SMS-SC sends the trigger message to the UE, where the submit trigger message includes information indicating that when failing to send the trigger message, the SMS-SC does not need to store the trigger message, so that after failing to send the trigger message, the SMS-SC deletes the trigger message.

The processor 1102 is further configured to, when the delivery report carries a delivery failure cause, resend the trigger message according to the delivery failure cause.

Further, the processor 1102 is specifically configured to:

when the delivery report received by the receiver 1101 includes trigger message saving indication information, wait for the SMS-SC to resend the trigger message, where the trigger message saving indication information is used to indicate that the SMS-SC saves the trigger message after failing to send the trigger message.

Further, the sender 1003 is further configured to, before the processor 1102 resends the trigger message according to the delivery report received by the receiver 1101, subscribe, from a home subscriber server HSS, to a notification message indicating that the UE is reachable.

The receiver 1101 is further configured to receive the notification message that is sent by the HSS and indicates that the UE is reachable.

The processor 1102 is further configured to resend the trigger message after the receiver 1101 receives the notification message that is sent by the HSS and indicates that the UE is reachable.

According to the MTC-IWF device provided in this embodiment of the present invention, when an SMS-SC fails to send a trigger message, an MTC-IWF device can receive a delivery report sent by the SMS-SC, and then the MTC-IWF device waits, according to the delivery report, for the SMS-SC to resend the trigger message, or the MTC-IWF device resends the trigger message according to the delivery report. Compared with the prior art where after the MTC-IWF device resends the trigger message to a UE, the SMS-SC still resends the trigger message to the UE, that the UE repeatedly receives the trigger message can be avoided, thereby reducing a signaling overhead generated by sending the trigger message, and saving network resources.

Figure 12:
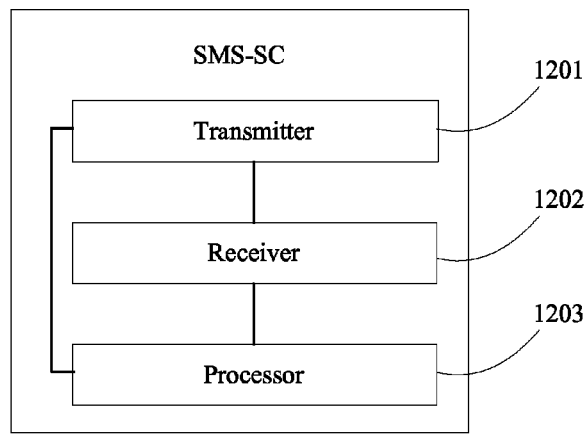
FIG. 12 is a schematic structural diagram of a second SMS-SC device according to an embodiment of the present invention.

Referring to implementation of the foregoing method embodiments, an embodiment of the present invention provides an SMS-SC, where the SMS-SC communicates with an MTC-IWF device by using a first interface. As shown in FIG. 12, the SMS-SC includes: a transmitter 1201, a receiver 1202, and a processor 1203, where:

the transmitter 1201 is configured to send a trigger Trigger message to a user equipment UE; and the transmitter 1201 is further configured to, when failing to send a trigger Trigger message to a user equipment UE, send a delivery report to a Machine Type Communications-Inter Working Function MTC-IWF device, so that the MTC-IWF device waits, according to the delivery report, for the SMS-SC to resend the trigger message, or the MTC-IWF device resends the trigger message according to the delivery report.

Further, the transmitter 1201 is specifically configured to:

carry a delivery failure cause in the delivery report, so that the MTC-IWF device waits, according to the delivery failure cause, for the SMS-SC to resend the trigger message, or the MTC-IWF device resends the trigger message according to the delivery failure cause.

Further, the receiver 1202 is configured to, after the transmitter 1201 sends the delivery report to the MTC-IWF device, receive a trigger message deleting indication sent by the MTC-IWF device.

The processor 1203 is configured to delete the trigger message according to the trigger message deleting indication received by the receiver 1202, so that the trigger message sending unit cancels resending of the trigger message to the UE.

Further, the processor 1203 is further configured to delete the trigger message before the receiver 1202 sends the delivery report to the MTC-IWF device.

The transmitter 1201 is further configured to add trigger message deleting indication information to the delivery report, so that the MTC-IWF device resends the trigger message according to the trigger message deleting indication information, where the trigger message deleting indication information is used to indicate that the SMS-SC has deleted the trigger message after failing to send the trigger message.

Further, the receiver 1202 is further configured to, before the transmitter 1201 sends the trigger message to the UE, receive a submit trigger message sent by the MTC-IWF device, where the submit trigger message includes information indicating that when failing to send the trigger message, the SMS-SC does not need to store the trigger message.

Further, the processor 1203 is further configured to delete the trigger message when the transmitter 1201 fails to send the trigger message to the UE.

Further, the processor 1203 is further configured to add trigger message saving indication information to the delivery report before the transmitter 1201 sends the delivery report to the MTC-IWF device, so that the MTC-IWF device waits, according to the trigger message saving indication information, for the SMS-SC to resend the trigger message, where the trigger message saving indication information is used to indicate that the SMS-SC has saved the trigger message after failing to send the trigger message.

According to the SMS-SC provided in this embodiment of the present invention, when an SMS-SC fails to send a trigger message, the SMS-SC can send a delivery report to an MTC-IWF device, and then the MTC-IWF device waits, according to the delivery report, for the SMS-SC to resend the trigger message, or the MTC-IWF device resends the trigger message according to the delivery report. Compared with the prior art where after the MTC-IWF device resends the trigger message to a UE, the SMS-SC still resends the trigger message to the UE, that the UE repeatedly receives the trigger message can be avoided, thereby reducing a signaling overhead generated by sending the trigger message, and saving network resources.

Figure 13:
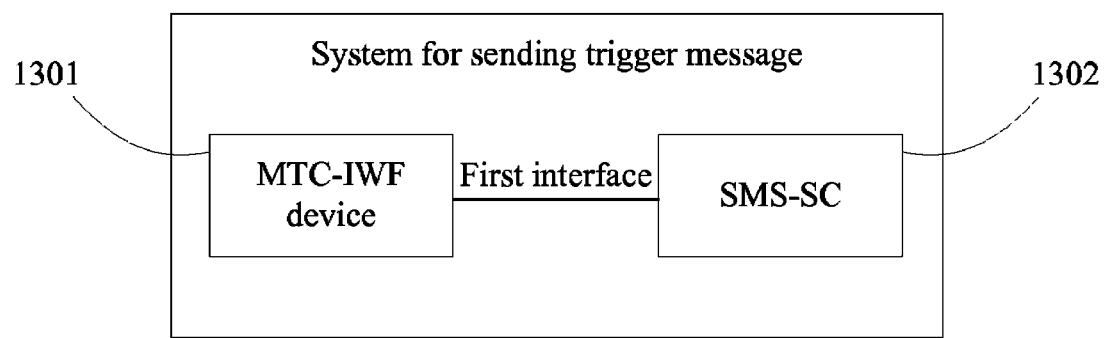
FIG. 13 is a schematic diagram of a second trigger message sending system according to an embodiment of the present invention.

Referring to the device embodiments shown in the foregoing FIG. 11 and FIG. 12, an embodiment of the present invention provides a trigger message sending system. As shown in FIG. 13, the system includes: an MTC-IWF device 1301 and an SMS-SC1302, where the MTC-IWF device 1301 is the MTC-IWF device shown in FIG. 11, and the SMS-SC1302 is the SMS-SC shown in FIG. 12. The SMS-SC1302 communicates with the MTC-IWF device 1301 by using a first interface, where:

the SMS-SC1302 is configured to send a delivery report to the MTC-IWF1301 device when the SMS-SC1302 fails to send a trigger Trigger message to a user equipment UE; and the MTC-IWF1301 device is configured to receive the delivery report sent by the SMS-SC1302, and wait, according to the delivery report, for the SMS-SC1302 to resend the trigger message, or resend the trigger message according to the delivery report.

According to the trigger message sending system provided in this embodiment of the present invention, when an SMS-SC fails to send a trigger message, an MTC-IWF device can receive a delivery report sent by the SMS-SC, and then the MTC-IWF device waits, according to the delivery report, for the SMS-SC to resend the trigger message, or the MTC-IWF device resends the trigger message according to the delivery report. Compared with the prior art where after the MTC-IWF device resends the trigger message to a UE, the SMS-SC still resends the trigger message to the UE, that the UE repeatedly receives the trigger message can be avoided, thereby reducing a signaling overhead generated by sending the trigger message, and saving network resources.

It may be clearly understood by a person skilled in the art that, for the purpose of convenient and brief description, division of the foregoing function modules is taken as an example for illustration. In actual application, the foregoing functions can be allocated to different modules and implemented according to a requirement, that is, an inner structure of an apparatus is divided into different function modules to implement all or part of the functions described above. For a detailed working process of the foregoing system, apparatus, and unit, reference may be made to a corresponding process in the foregoing method embodiments, and details are not described herein again.

In the several embodiments provided in the present application, it should be understood that the disclosed system, apparatus, and method may be implemented in other manners. For example, the described apparatus embodiment is merely exemplary. For example, the module or unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. A part or all of the units may be selected according to actual needs to achieve the objectives of the solutions of the embodiments.

In addition, functional units in the embodiments of the present invention may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of the present invention essentially, or the part contributing to the prior art, or all or a part of the technical solutions may be implemented in the form of a software product. The software product is stored in a storage medium and includes several instructions for instructing a computer device (which may be a personal computer, a server, or a network device) or a processor to perform all or a part of the steps of the methods described in the embodiments of the present invention. The foregoing storage medium includes: any medium that can store program code, such as a USB flash drive, a removable hard disk, a read-only memory (ROM, Read-Only Memory), a random access memory (RAM, Random Access Memory), a magnetic disk, or an optical disc.

The foregoing embodiments are merely intended for exemplarily describing the technical solutions of the present invention other than limiting the present invention. Although the present invention and benefits of the present invention are described in detail with reference to the foregoing embodiments, persons of ordinary skill in the art should understand that they may still make modifications to the technical solutions described in the foregoing embodiments or make equivalent replacements to some technical features thereof, without departing from the scope of the claims of the present invention.

It should be noted that a storing function of the foregoing MTC-IWF entity may be implemented by an MTC-IWF and may also be implemented by another function entity that is logically named differently from the MTC-IWF but physically the same.

The foregoing descriptions are merely specific implementation manners of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A trigger message sending method, comprising:
   receiving, by a Machine Type Communications-Inter Working Function MTC-IWF device, a delivery report sent by a short message service-service center SMS-SC, wherein the delivery report is sent to the MTC-IWF device by the SMS-SC after the SMS-SC fails to send a trigger message to a user equipment UE; and
   receiving, by the MTC-IWF device according to the delivery report, the trigger message resent by the SMS-SC, or resending, by the MTC-IWF device, the trigger message according to the delivery report.

2. The method according to claim 1, wherein the receiving, by the MTC-IWF device according to the delivery report, the trigger message resent by the SMS-SC, or resending, by the MTC-IWF device, the trigger message according to the delivery report specifically comprises:
   when the delivery report carries a delivery failure cause, receiving, by the MTC-IWF device according to the delivery failure cause, the trigger message resent by the SMS-SC, or resending, by the MTC-IWF device, the trigger message according to the delivery failure cause.

3. The method according to claim 2, wherein, the receiving, by the MTC-IWF device according to the delivery failure cause, the trigger message resent by the SMS-SC, or resending, by the MTC-IWF device, the trigger message according to the delivery failure cause specifically comprises:
   if the delivery failure cause is Absent Subscriber or MS Busy for MT SMS, receiving, by the MTC-IWF device, the trigger message resent by the SMS-SC; and
   if the delivery failure cause is another cause other than Absent Subscriber and MS Busy for MT SMS, resending, by the MTC-IWF device, the trigger message.

4. The method according to claim 1, wherein when the MTC-IWF device resends the trigger message according to the delivery report, the method further comprises:
   instructing, by the MTC-IWF device, the SMS-SC to delete the trigger message, so that the SMS-SC cancels resending of the trigger message to the UE.

5. The method according to claim 1, wherein the resending, by the MTC-IWF device, the trigger message according to the delivery report specifically comprises:
   when the delivery report comprises trigger message deleting indication information, resending, by the MTC-IWF, the trigger message, wherein the trigger message deleting indication information is used to indicate that the SMS-SC deletes the trigger message after failing to send the trigger message.

6. The method according to claim 1, wherein before the SMS-SC sends the trigger message to the UE, the method further comprises:
   sending, by the MTC-IWF device, a submit trigger message to the SMS-SC, so that the SMS-SC sends the trigger message to the UE, wherein the submit trigger message comprises information indicating that when failing to send the trigger message, the SMS-SC does not need to store the trigger message, so that after failing to send the trigger message, the SMS-SC deletes the trigger message; and
   the receiving, by the MTC-IWF device according to the delivery report, the trigger message resent by the SMS-SC, or resending, by the MTC-IWF device, the trigger message according to the delivery report specifically comprises:
   when the delivery report carries a delivery failure cause, resending, by the MTC-IWF device, the trigger message according to the delivery failure cause.

7. The method according to claim 1, wherein the receiving, by the MTC-IWF device according to the delivery report, the trigger message resent by the SMS-SC specifically comprises:
   when the delivery report comprises trigger message saving indication information, receiving, by the MTC-IWF device, the trigger message resent by the SMS-SC, wherein the trigger message saving indication information is used to indicate that the SMS-SC saves the trigger message after failing to send the trigger message.

8. The method according to claim 1, wherein before the resending, by the MTC-IWF device, the trigger message according to the delivery report, the method further comprises:
   subscribing, by the MTC-IWF device from a home subscriber server HSS, to a notification message indicating that the UE is reachable; and
   the resending, by the MTC-IWF device, the trigger message according to the delivery report specifically comprises:
   resending, by the MTC-IWF device, the trigger message after the notification message that is sent by the HSS and indicates that the UE is reachable is received.

9. A Machine Type Communications-Inter Working Function MTC-IWF device, comprising:
   a receiving unit, configured to receive a delivery report sent by a short message service-service center SMS-SC, wherein the delivery report is sent to the MTC-IWF device by the SMS-SC after the SMS-SC fails to send a trigger message to a user equipment UE; and
   a processing unit, configured to receive, according to the delivery report received by the receiving unit, the trigger message resent by the SMS-SC, or resend the trigger message according to the delivery report.

10. The MTC-IWF device according to claim 9, wherein the processing unit is specifically configured to:
    when the delivery report received by the receiving unit carries a delivery failure cause, receive, according to the delivery failure cause, the trigger message resent by the SMS-SC, or resend the trigger message according to the delivery failure cause.

11. The MTC-IWF device according to claim 10, wherein the processing unit is specifically configured to:
when the delivery failure cause received by the receiving unit is Absent Subscriber Absent Subscriber or MS Busy for MT SMS MS Busy for MT SMS, receive the trigger message resent by the SMS-SC; and
when the delivery failure cause received by the receiving unit is another cause other than Absent Subscriber and MS Busy for MT SMS, resend the trigger message.

12. The MTC-IWF device according to claim 9, wherein the MTC-IWF device further comprises:
an indicating unit, configured to, when the processing unit resends the trigger message according to the delivery report received by the receiving unit, instruct the SMS-SC to delete the trigger message, so that the SMS-SC cancels resending of the trigger message to the UE.

13. The MTC-IWF device according to claim 9, wherein the processing unit is specifically configured to:
when the delivery report received by the receiving unit comprises trigger message deleting indication information, resend the trigger message, wherein the trigger message deleting indication information is used to indicate that the SMS-SC deletes the trigger message after failing to send the trigger message.

14. The MTC-IWF device according to claim 9, wherein the MTC-IWF device further comprises:
a sending unit, configured to send a submit trigger message to the SMS-SC before the SMS-SC sends the trigger message to the UE, so that the SMS-SC sends the trigger message to the UE, wherein the submit trigger message comprises information indicating that when failing to send the trigger message, the SMS-SC does not need to store the trigger message, so that after failing to send the trigger message, the SMS-SC deletes the trigger message; wherein
the processing unit is further configured to, when the delivery report carries a delivery failure cause, resend the trigger message according to the delivery failure cause.

15. The MTC-IWF device according to claim 9, wherein the processing unit is specifically configured to:
when the delivery report received by the receiving unit comprises trigger message saving indication information, receive the trigger message resent by the SMS-SC, wherein the trigger message saving indication information is used to indicate that the SMS-SC saves the trigger message after failing to send the trigger message.

16. The MTC-IWF device according to claim 14, wherein the sending unit is further configured to, before the processing unit resends the trigger message according to the delivery report received by the receiving unit, subscribe, from a home subscriber server HSS, to a notification message indicating that the UE is reachable;
the receiving unit is further configured to receive the notification message that is sent by the HSS and indicates that the UE is reachable; and
the processing unit is further configured to resend the trigger message after the receiving unit receives the notification message that is sent by the HSS and indicates that the UE is reachable.

17. A short message service-service center SMS-SC, comprising:

a trigger message sending unit, configured to send a trigger Trigger message to a user equipment UE; and
a delivery report sending unit, configured to send a delivery report to a Machine Type Communications-Inter Working Function MTC-IWF device when the trigger message sending unit fails to send the trigger Trigger message to the UE, so that the MTC-IWF device receives, according to the delivery report, the trigger message resent by the SMS-SC, or the MTC-IWF device resends the trigger message according to the delivery report.

18. The SMS-SC according to claim 17, wherein the delivery report sending unit is specifically configured to:
carry a delivery failure cause in the delivery report, so that the MTC-IWF device receives, according to the delivery failure cause, the trigger message resent by the SMS-SC, or the MTC-IWF device resends the trigger message according to the delivery failure cause.

19. The SMS-SC according to claim 17, wherein the SMS-SC further comprises:
a receiving unit, configured to, after the delivery report sending unit sends the delivery report to the MTC-IWF device, receive a trigger message deleting indication sent by the MTC-IWF device; and
a first processing unit, configured to delete the trigger message according to the trigger message deleting indication received by the receiving unit, so that the trigger message sending unit cancels resending of the trigger message to the UE.

20. The SMS-SC according to claim 17, wherein the SMS-SC further comprises:
a second processing unit, configured to delete the trigger message before the delivery report sending unit sends the delivery report to the MTC-IWF device; wherein
the delivery report sending unit is further configured to add trigger message deleting indication information to the delivery report, so that the MTC-IWF device resends the trigger message according to the trigger message deleting indication information, wherein the trigger message deleting indication information is used to indicate that the SMS-SC has deleted the trigger message after failing to send the trigger message.

21. The SMS-SC according to claim 17, wherein the receiving unit is further configured to, before the trigger message sending unit sends the trigger message to the UE, receive a submit trigger message sent by the MTC-IWF device, wherein the submit trigger message comprises information indicating that when failing to send the trigger message, the SMS-SC does not need to store the trigger message; and
the SMS-SC further comprises:
a third processing unit, configured to delete the trigger message when the trigger message sending unit fails to send the trigger message to the UE.

22. The SMS-SC according to claim 17, wherein the SMS-SC further comprises:
a fourth processing unit, configured to add trigger message saving indication information to the delivery report before the delivery report sending unit sends the delivery report to the MTC-IWF device, so that the MTC-IWF device receives, according to the trigger message saving indication information, the trigger message resent by the SMS-SC, wherein the trigger message saving indication information is used to indicate that the SMS-SC has saved the trigger message after failing to send the trigger message.

* * * * *